US010352590B2

(12) United States Patent
Diaz et al.

(10) Patent No.: US 10,352,590 B2
(45) Date of Patent: Jul. 16, 2019

(54) MINI-CHANNEL TUBE SOLAR COLLECTOR

(71) Applicant: The Regents of the University of California, Oakland, CA (US)

(72) Inventors: Gerardo C. Diaz, Merced, CA (US); Neeraj Sharma, Merced, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 327 days.

(21) Appl. No.: 15/095,865

(22) Filed: Apr. 11, 2016

(65) Prior Publication Data
US 2016/0298876 A1 Oct. 13, 2016

Related U.S. Application Data

(63) Continuation of application No. 13/055,136, filed as application No. PCT/US2009/051310 on Jul. 21, 2009, now Pat. No. 9,310,099.
(Continued)

(51) Int. Cl.
*F24S 10/40* (2018.01)
*F24S 20/20* (2018.01)
(Continued)

(52) U.S. Cl.
CPC ............ *F24S 10/45* (2018.05); *F24S 10/502* (2018.05); *F24S 10/75* (2018.05); *F24S 20/20* (2018.05);
(Continued)

(58) Field of Classification Search
CPC .... Y02E 10/41; Y10T 29/49956; F24S 10/45; F24S 10/502; F24S 80/30; F24S 20/20; F24S 10/75
(Continued)

(56) References Cited

U.S. PATENT DOCUMENTS 4,027,653 A 6/1977 Meckler
4,066,063 A 1/1978 Gross et al.
(Continued)

FOREIGN PATENT DOCUMENTS

CN 101021365 8/2007

OTHER PUBLICATIONS

Abdel-Khalik, S.I. (1976) "Heat removal factor for a flatplate solar collector with a serpentine tube," Solar Energy, 18:59-64.
(Continued)

*Primary Examiner* — Avinash A Savani
*Assistant Examiner* — Rabeeul I Zuberi
(74) *Attorney, Agent, or Firm* — Foley & Lardner LLP; Antoinette F. Konski; Albert Heng

(57) ABSTRACT

A solar collector device is provided. The solar collector device includes an evacuated tube and a mini-channel tube mounted within the evacuated tube, the mini-channel tube comprising a first plurality of ports for inflow of a heat-transfer fluid and a second plurality of ports for outflow of the heat-transfer fluid to a heat exchange system. The mini-channel tube may have a hydraulic diameter in a range of approximately 3 millimeters to approximately 200 micrometers. The mini-channel tube may have a hydraulic diameter in a range of approximately 200 micrometers to approximately 10 micrometers.

35 Claims, 39 Drawing Sheets

Related U.S. Application Data

(60) Provisional application No. 61/082,698, filed on Jul. 22, 2008.

(51) Int. Cl.
*F24S 10/50* (2018.01)
*F24S 10/75* (2018.01)
*F24S 80/30* (2018.01)

(52) U.S. Cl.
CPC .............. *F24S 80/30* (2018.05); *Y02E 10/41* (2013.01); *Y02E 10/44* (2013.01); *Y10T 29/49826* (2015.01); *Y10T 29/49956* (2015.01)

(58) Field of Classification Search
USPC ................ 126/634, 641, 643, 651, 652, 704
See application file for complete search history.

(56) References Cited

U.S. PATENT DOCUMENTS

| | | | | |
|---|---|---|---|---|
| 4,122,831 | A | * | 10/1978 | Mahdjuri ................ F24J 2/055 126/657 |
| 4,303,059 | A | | 12/1981 | Ford |
| 4,321,300 | A | * | 3/1982 | Farrauto .................. F24J 2/487 126/619 |
| 4,392,610 | A | * | 7/1983 | Moskal ..................... F24H 8/00 122/20 B |
| 4,409,964 | A | * | 10/1983 | Shimada ................. F24J 2/055 126/652 |
| 4,414,961 | A | | 11/1983 | Luebke |
| 4,474,170 | A | | 10/1984 | McConnell et al. |
| 4,531,511 | A | * | 7/1985 | Hochberg ............. E06B 3/6612 126/706 |
| 4,586,489 | A | * | 5/1986 | Voll ....................... F24J 2/0488 126/655 |
| 6,014,967 | A | | 1/2000 | Rekstad et al. |
| 6,488,900 | B1 | | 12/2002 | Call et al. |
| 6,637,427 | B1 | | 10/2003 | Yeomans |
| 7,766,007 | B2 | | 8/2010 | Staschik |
| 2002/0073987 | A1 | | 6/2002 | Fukutake et al. |
| 2003/0037907 | A1 | | 2/2003 | Lee |
| 2003/0101988 | A1 | | 6/2003 | Rhodes |
| 2008/0236572 | A1 | * | 10/2008 | Schaefer .................... F24J 2/05 126/657 |
| 2009/0139515 | A1 | | 6/2009 | Gee et al. |
| 2009/0293866 | A1 | | 12/2009 | Horne et al. |

OTHER PUBLICATIONS

Balaras, C.A. et al. (2007) "Solar air conditioning in Europe," Renewable and Sustainable Energy Reviews, 11:299-314.

Diaz, G. et al. (2008) "Effect of surface radiation on natural convection in parabolic enclosures," Numerical Heat Transfer, Part A, 53(9):891-906.

Henkel, E.T. (2005) "New Solar Thermal Energy Applications for Commercial, Industrial, and Government Facilities," Energy Engineering, 102(2):39-58.

Henkel, E.T. (2003) "New Solar Thermal Energy Applications for Commercial, Industrial, and Government Facilities," Presented to the World Energy Engineering Congress in Atlanta, GA, on Nov. 12, 2003.

Henning, H-M. (2007) "Solar assisted air conditioning of buildings an overview," Applied Thermal Engineering, 27:1734-1749.

International Search Report for International Application No. PCT/US2009/051310, dated Feb. 23, 2010.

Kim, N-H. et al. (2008) "Distribution of air-water annular flow in a header of a parallel flow heat exchanger," International Journal of Heat and Mass Transfer, 51: 977-992.

Kim, D.S. et al. (2008) "Solar refrigeration options a state-of-the-art review," International Journal of Refrigeration, 31:3-15.

Lowenstein, A. et al. (2007) "A zero carryover liquid-desiccant air conditioner for solar applications," Proceedings of the ASME International Solar Energy Conference, ISEC2006:397-407.

O'Gallager, J.J. et al. (2006) "Continuing development of a high-performance low-cost XCPC," Proceedings of the ASME International Solar Energy Conference—Solar Engineering, 6p.

Rahman, F. et al. (1984) "Two-dimensional mathematical model of evacuated tubular solar collector," ASME Journal of Solar Energy Engineering, 106:341-346.

Sawhney, R.L. et al. (2008) "Performance parameters of an evacuated tubular collector with a U-tube fluid channel," ASME Journal of Solar Energy Engineering, 109:346-348.

Steinke, M.E. et al. (2004) "Single-phase heat transfer enhancement techniques in microchannel and minichannel flows," Proceedings of Microchannels and Minichannels ASME conference, ICMM2004-2328:141-148.

Vijayaraghavan, S. et al. (2005) "Organic Working Fluids for a Combined Power and Cooling Cycle," Journal of Energy Resources Technology. Transactions of the ASME, 127:125-130.

Winston, R. (1974) "Principles of solar concentrators of a novel design," Solar Energy, 20:59-67.

Yun, R. et al. (2007) "Numerical analysis on a microchannel evaporator designed for $CO_2$ air-conditioning systems," Applied Thermal Engineering, 27:1320-1326.

Notice of Allowance in U.S. Appl. No. 13/055,136, dated Dec. 3, 2015.

Non-Final Office Action in U.S. Appl. No. 13/055,136, dated Jun. 8, 2015.

Final Office Action in U.S. Appl. No. 13/055,136, dated Feb. 25, 2015.

Non-Final Office Action in U.S. Appl. No. 13/055,136, dated Aug. 6, 2014.

Restriction Requirement in U.S. Appl. No. 13/055,136, dated Oct. 4, 2013.

* cited by examiner

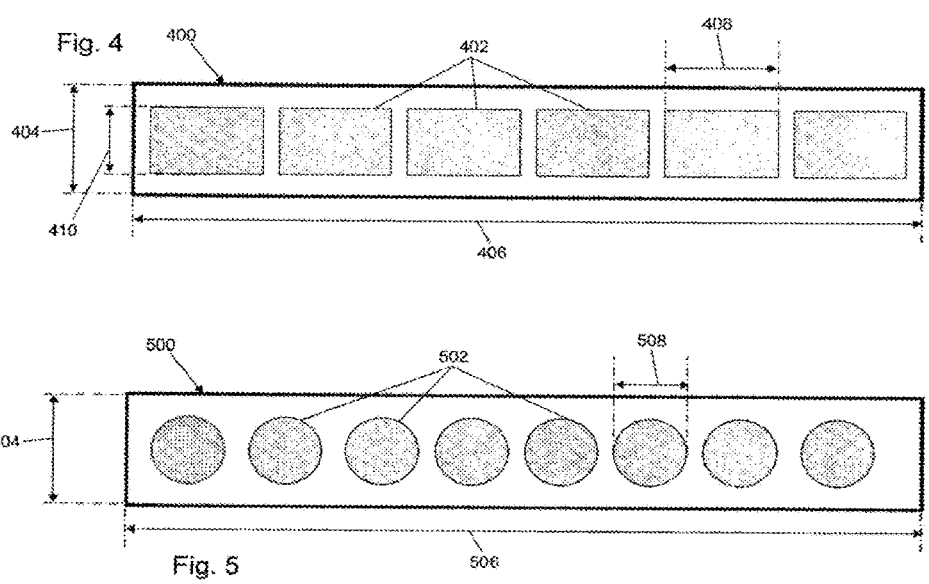

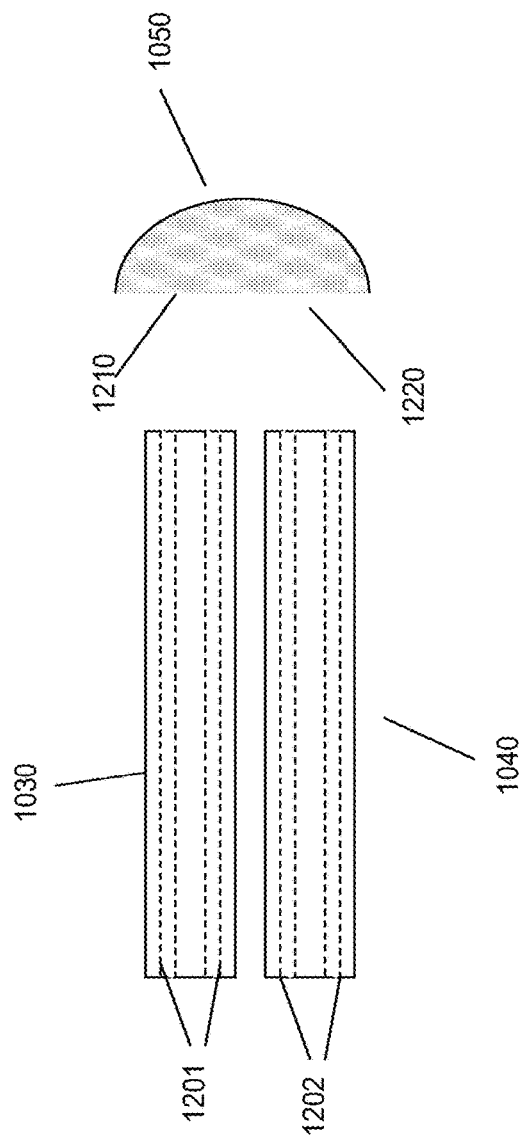

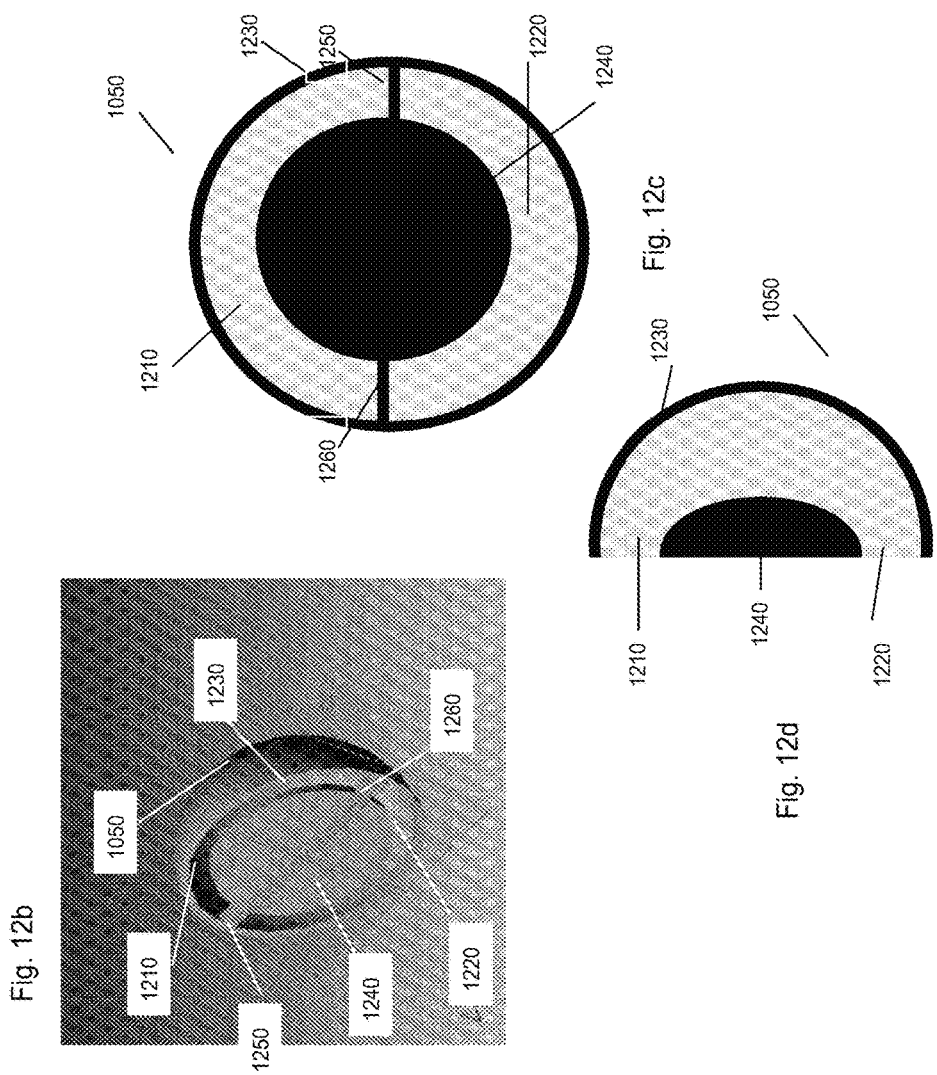

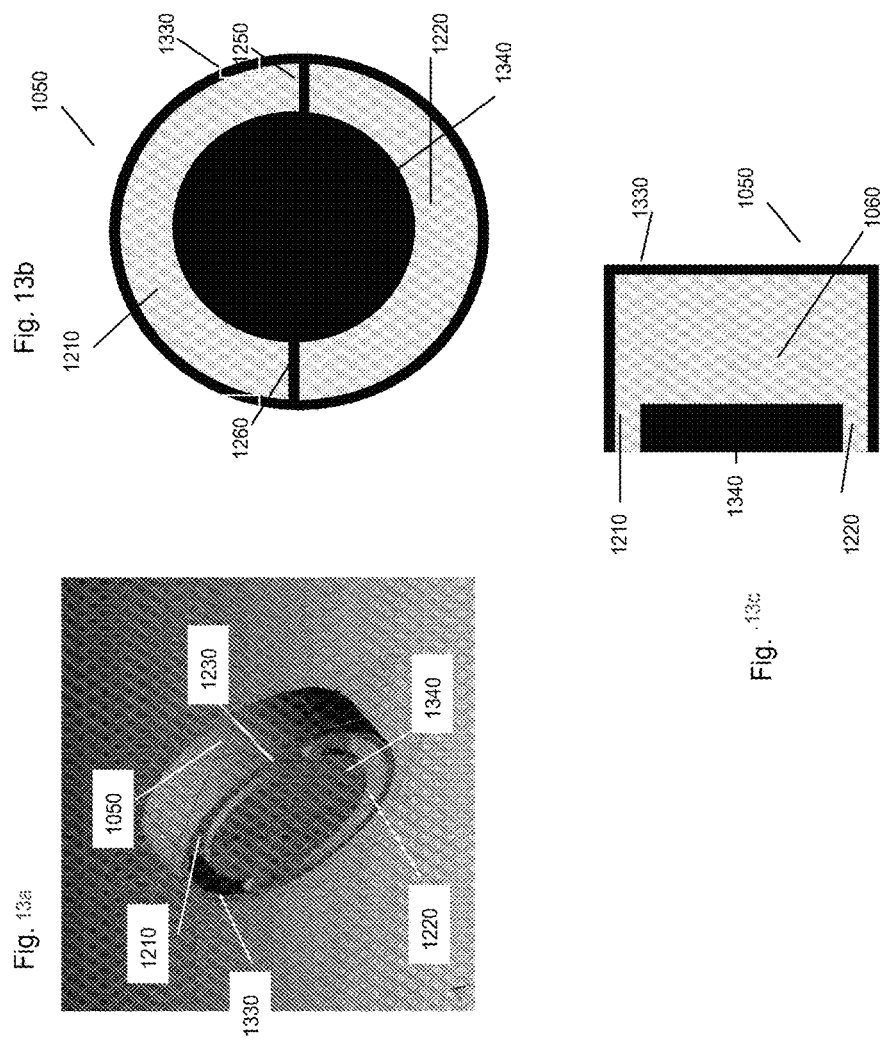

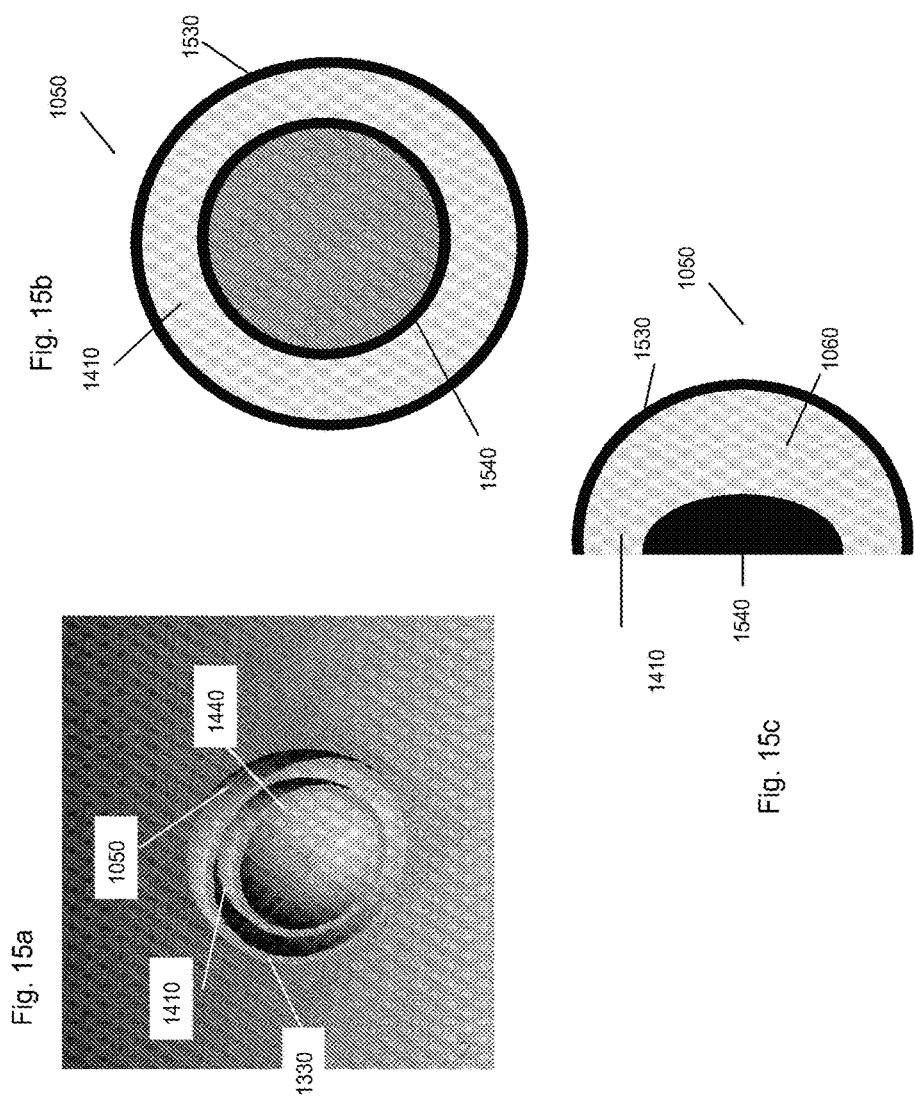

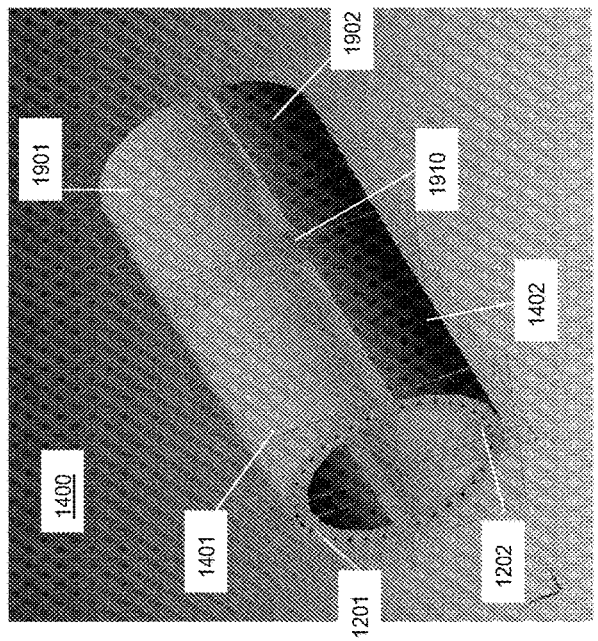
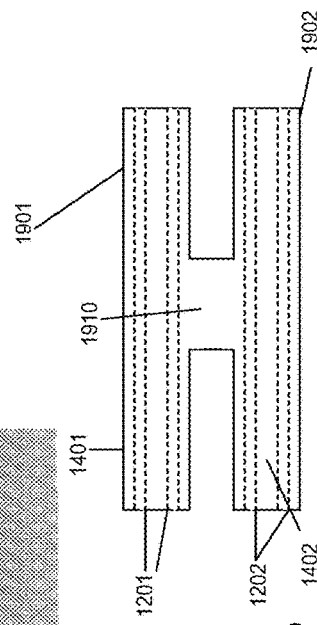
Fig. 19a
Fig. 19b

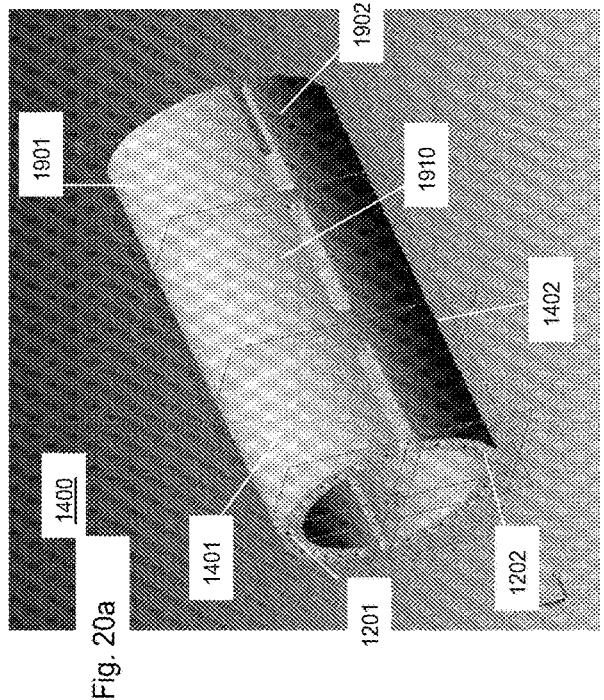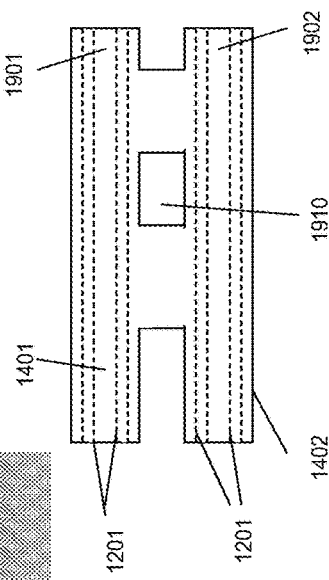

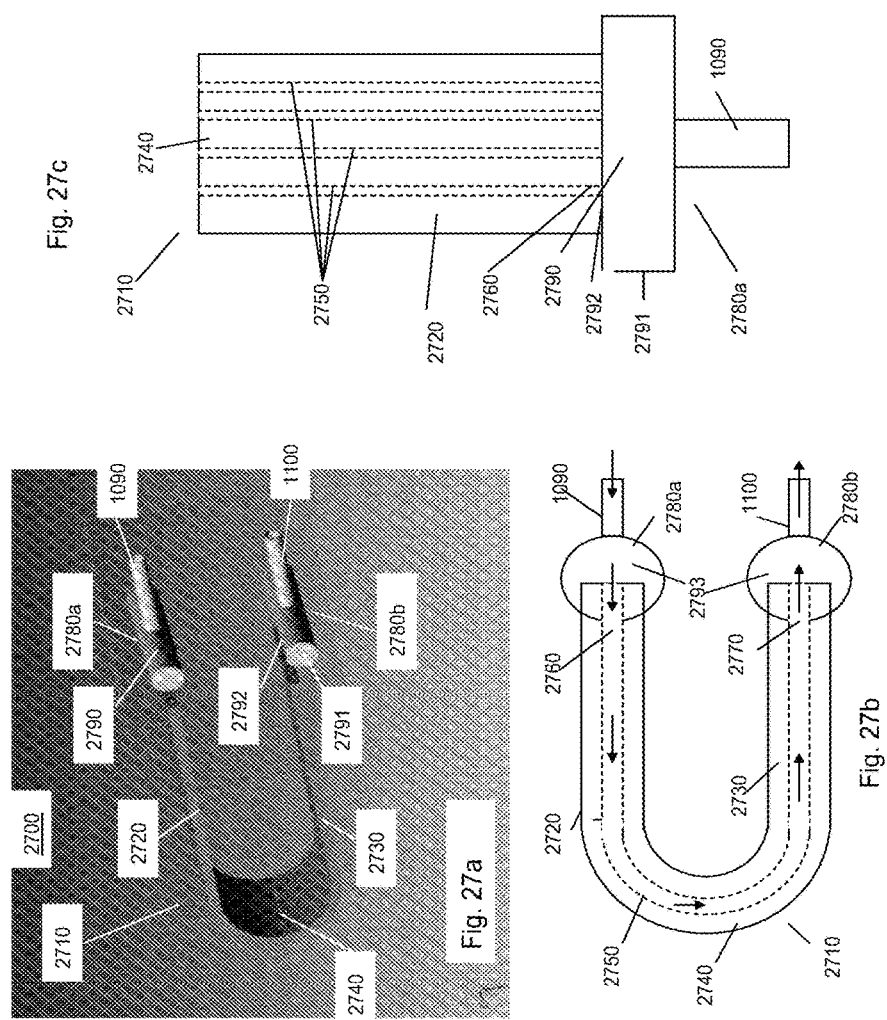

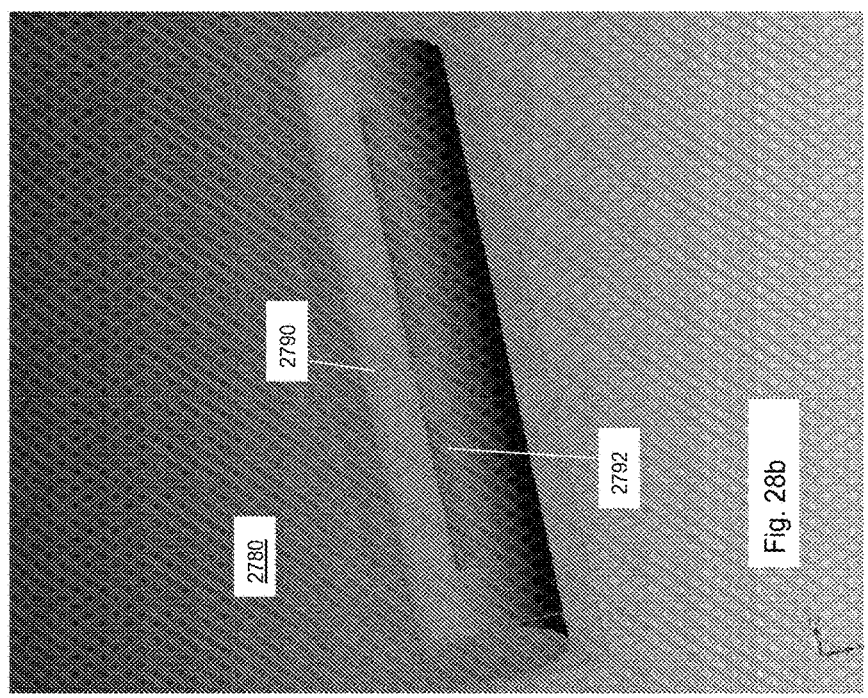

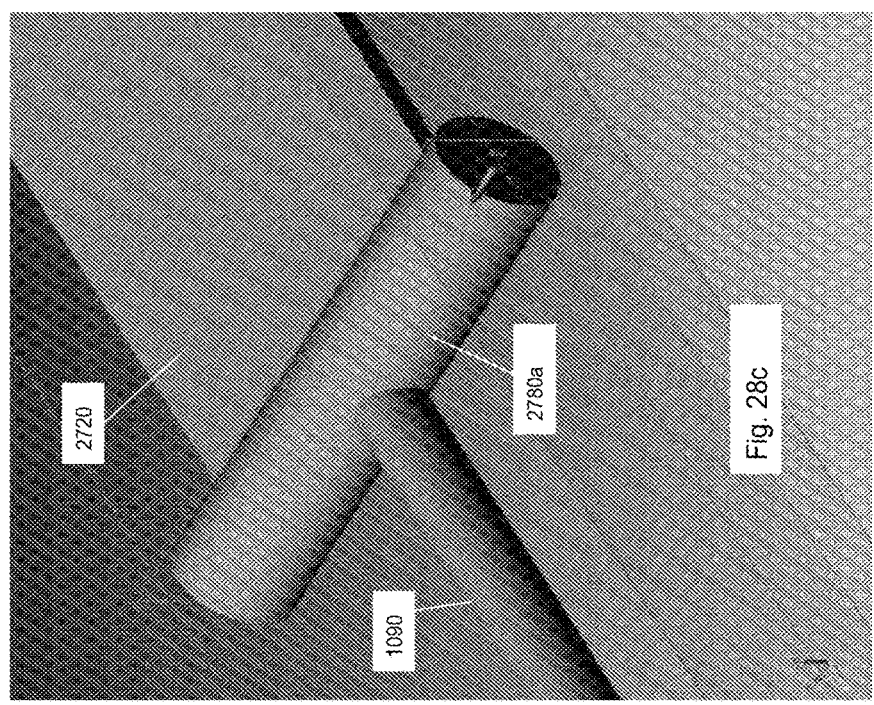

MINI-CHANNEL TUBE SOLAR COLLECTOR

CROSS-REFERENCE TO RELATED APPLICATIONS

This application is a continuation under 35 U.S.C. § 120 of U.S. patent application Ser. No. 13/055,136, filed Apr. 15, 2011, now U.S. Pat. No. 9,310,099, which is a national stage application under 35 U.S.C. § 371 of International Application No. PCT/US2009/051310, filed Jul. 21, 2009, which in turn claims priority under 35 U.S.C. § 119(e) to U.S. Provisional Patent Application No. 61/082,698, filed Jul. 22, 2008, the entire contents of each of which are incorporated herein by reference.

FIELD

The field of the disclosure relates generally to solar collectors, and more particularly to solar collectors using heat-transfer fluid.

BACKGROUND

The utilization of renewable energy sources is becoming popular as a way to reduce the dependence on fossil fuels and to decrease the emissions of pollutants and green-house gases into the atmosphere. Solar thermal systems provide the capability of generating heat, electric power, and/or cooling in a sustainable way and for a variety of applications due to the relatively large range of temperatures that different collector configurations can provide. Readily available in the market, solar collectors vary in performance depending on their design. The effective transfer of the heat obtained from the sun to the heat-transfer fluid remains a subject of continued research.

SUMMARY

In an exemplary embodiment, a solar collector device is provided. The device includes, but is not limited to, an evacuated tube (or other shaped enclosure) and a mini-channel tube mounted within the evacuated tube. The mini-channel tube includes a first plurality of ports for inflow of a heat-transfer fluid and a second plurality of ports for outflow of the heat-transfer fluid to a heat exchange system. The solar collector device may be incorporated into a solar collection system that may include a solar energy concentrator configured to direct solar energy onto the solar collector device and a connector mounting the solar collector device to the solar energy concentrator. The solar collection system may be incorporated into a solar energy system that may include the heat exchange system and a fluid flow system configured to control the flow of the heat-transfer fluid through the mini-channel tube.

In one aspect, a solar collector device is disclosed including: an evacuated tube; and a mini-channel tube mounted within the evacuated tube, the mini-channel tube including a first plurality of ports for inflow of a heat-transfer fluid and a second plurality of ports for outflow of the heat-transfer fluid to a heat exchange system. The mini-channel tube includes a plurality of mini-channels, each extending from a respective one of the first plurality of ports for inflow of a heat-transfer fluid to a respective one of the second plurality of ports for outflow of the heat-transfer fluid.

Some embodiments include an absorber fin mounted within the evacuated tube and mounted to the mini-channel tube.

In some embodiments, the first plurality of ports is mounted within the second plurality of ports.

In some embodiments, the second plurality of ports are mounted to the absorber fin.

In some embodiments, at least one of the first plurality of ports is mounted within a respective one of the second plurality of ports.

In some embodiments, the second plurality of ports are mounted to the evacuated tube.

In some embodiments, the mini-channel tube is U-shaped within the evacuated tube. In some embodiments, the U-shaped mini-channel tube has a curved major dimension.

In some embodiments, the first plurality of ports are rectangular in shape. In some embodiments, the first plurality of ports are circular in shape.

Some embodiments include a heat-transfer fluid enclosed within the mini-channel tube.

In some embodiments, each mini-channel has a hydraulic diameter in a range of approximately 3 millimeters to approximately 200 micrometers, or 10 millimeters to approximately 200 micrometers, or approximately 50 millimeters to approximately 200 micrometers, or approximately 100 millimeters to approximately 200 micrometers, or approximately 1000 millimeters to approximately 200 micrometers.

In some embodiments, each mini-channel has a hydraulic diameter in a range of approximately 200 micrometers to approximately 10 millimeters.

In another aspect, a solar collection system is disclosed including: a solar collector including an evacuated tube; and a mini-channel tube mounted within the evacuated tube, the mini-channel tube including a first plurality of ports for inflow of a heat-transfer fluid and a second plurality of ports for outflow of the heat-transfer fluid to a heat exchange system; a solar energy concentrator configured to direct solar energy onto the solar collector; and a connector mounting the solar collector to the solar energy concentrator. The mini-channel tube includes a plurality of mini-channels, each extending from a respective one of the first plurality of ports for inflow of a heat-transfer fluid to a respective one of the second plurality of ports for outflow of the heat-transfer fluid to a heat exchange system.

In some embodiments, the mini-channel tube is U-shaped within the evacuated tube.

In some embodiments, the U-shaped mini-channel tube has a curved major dimension.

In some embodiments, the mini-channel tube has a hydraulic diameter in a range of approximately 3 millimeters to approximately 200 micrometers, or approximately 10 millimeters to approximately 200 micrometers, or approximately 50 millimeters to approximately 200 micrometers, or approximately 100 millimeters to approximately 200 micrometers, or approximately 1000 millimeters to approximately 200 micrometers.

In some embodiments, the mini-channel tube has a hydraulic diameter in a range of approximately 200 micrometers to approximately 10 millimeters.

In another aspect, a solar energy system is disclosed including: a heat exchange system; a solar collector including an evacuated tube; a mini-channel tube mounted within the evacuated tube, the mini-channel tube including a first plurality of ports for inflow of a heat-transfer fluid and a second plurality of ports for outflow of the heat-transfer fluid to the heat exchange system, where the mini-channel tube includes: a plurality of mini-channels, each extending from a respective one of the first plurality of ports for inflow of a heat-transfer fluid to a respective one of the second plurality of ports for outflow of the heat-transfer fluid; and a fluid flow system configured to control the flow of the heat-transfer fluid through the mini-channel tube.

Some embodiments include a solar energy concentrator configured to direct solar energy onto the solar collector.

In some embodiments, the mini-channel tube is U-shaped within the evacuated tube. In some embodiments, the U-shaped mini-channel tube has a curved major dimension.

In some embodiments, the mini-channel tube has a hydraulic diameter in a range of approximately 3 millimeters to approximately 200 micrometers, or approximately 10 millimeters to approximately 200 micrometers, or approximately 50 millimeters to approximately 200 micrometers, or approximately 100 millimeters to approximately 200 micrometers, or approximately 1000 millimeters to approximately 200 micrometers.

In some embodiments, the mini-channel tube has a hydraulic diameter in a range of approximately 200 micrometers to approximately 10 millimeters.

In another aspect, a solar collector is disclosed including an evacuated enclosure which is at least partially transparent to solar radiation; an input port for the inflow of a heat-transfer fluid; an output port for the outflow of the heat transfer fluid; a mixing chamber. An absorber is included within the enclosure including: a plurality of inflow mini-channels each extending between a respective inflow end in fluid communication with the input port and a respective outflow end in fluid communication with the mixing chamber, a plurality of outflow mini-channels each extending between a respective inflow end in fluid communication with the mixing chamber, and a respective outflow end in fluid communication with output port.

In some embodiments, the absorber extends between a distal end and a proximal end; the respective inflow ends of the plurality of inflow mini channels and the respective outflow ends of the plurality of outflow mini channels are located at the proximal end of the tube; the respective outflow ends of the plurality of inflow mini channels and the respective inflow ends of the plurality of outflow mini channels are located at the proximal end of the tube.

Some embodiments include an end cap which receives the distal end of the absorber and includes the mixing chamber.

In some embodiments, the absorber includes: a first section including the plurality of inflow mini channels: and a second section including the plurality of outflow mini-channels; where the first and second sections do not contact each other. The end cap includes a first opening for receiving in fluid-tight connection a distal end of the first section, and a second opening for receiving in fluid-tight connection a distal end of the second section.

Some embodiments include a fluid input connection including: an opening which receives the proximal end of the first section in fluid-tight connection, and; a passage in fluid communication with the input port and the respective inflow ends of the plurality of inflow mini channels, such that fluid input into the input port will flow through the passage into the inflow ends of the plurality of inflow mini channels.

Some embodiments include a fluid output connection including: an opening which receives the proximal end of the second section in fluid-tight connection, and a passage in fluid communication with the output port and the respective outflow ends of the plurality of outflow mini channels, such that fluid from the respective outflow ends will flow through the passage into the output port.

In some embodiments, the fluid input connection and the fluid output connection are thermally isolated from each other.

In some embodiments, the absorber includes a hollow tube disposed about a longitudinal axis extending between the distal end to the proximal end, the tube includes a pair of longitudinal slits extending from the proximal end to a point proximal the distal end to define first and second prongs of the tube; the plurality of inflow mini-channels extend along the first prong to the respective inflow ends of the plurality of inflow mini-channels located at a proximal end of the first prong; and the plurality of outflow mini-channels extend along the second prong to the respective outflow ends of the plurality of outflow mini channels at a proximal end of the second prong.

In some embodiments, the hollow tube includes an outer surface and an inner surface, and the end cap includes: an outer cap in fluid-tight connection with the outside surface of the tube; an inner plug in fluid-tight connection with the inside surface of the tube, where the mixing chamber includes a volume defined between the cap and the plug.

In some embodiments, the tube is substantially cylindrical, and the outer cap and inner plug include nested hemispheres.

In some embodiments, the tube is substantially cylindrical the outer cap and inner plug each include nested cylinders.

Some embodiments include a fluid input connection including: an opening for receiving in fluid-tight connection the proximal end of the first prong, the end including the respective inflow ends of the plurality of inflow mini channels; and a passage in fluid communication with the input port and the respective inflow ends of the plurality of inflow mini channels, such that fluid input into the input port will flow through the passage into the respective inflow ends of the plurality of inflow mini channels.

Some embodiments include a fluid output connection including: an opening for receiving in fluid-tight connection the proximal end of the second prong, the end including the respective outflow ends of the plurality of outflow mini channels and; a passage in fluid communication with the output port and the respective outflow ends of the plurality of outflow mini channels, such that fluid from the respective outflow ends will flow through the passage into the output port.

In some embodiments, the fluid input connection includes: a substantially half cylindrical drum including a base surface and a curved radial surface, each surface extending between front and back end faces, where the input port is mounted the front end face; the opening for receiving the proximal end of the first prong us located on the back end face; and the passage in fluid communication with the input port and the respective inflow ends of the plurality of inflow mini channels is located within the drum.

In some embodiments, the fluid output connection includes: a substantially half cylindrical drum including a base surface and a curved radial surface, each extending between front and back end faces. The input port is mounted to the front end face; the opening for receiving the proximal end of the first prong is located on the back end face, the passage in fluid communication with the output port and the respective outflow ends of the plurality of inflow mini channels is located within the drum.

In some embodiments, the base surface of the fluid output connection is located proximal to and facing the base surface of the fluid input connection.

In some embodiments, the enclosure includes a hollow tube having a curved inner surface, and where the curved radial surfaces of the fluid input and output connections proximal to and facing the inner surface of the enclosure.

Some embodiments include one or more supports extending between the first and second prongs and located within one of the longitudinal slits distal the proximal end of the absorber.

Some embodiments include one or more longitudinal slits extending from the distal end of the tube, where the tube includes another pair of longitudinal slits extending from the distal end to a point distal the proximal end to define third and forth prongs of the tube; the plurality of inflow mini-channels extend along the third prong to the respective outflow ends of the plurality of inflow mini-channels located at a distal end of the third prong; and the plurality of outflow mini-channels extend along the fourth prong to the respective inflow ends of the plurality of outflow mini channels at a distal end of the fourth prong.

In some embodiments, the end cap includes a first opening which receives the proximal end of the third prong to form a fluid-tight connection with the mixing chamber; and a second opening which receives the proximal end of the forth prong to form a fluid-tight connection with the mixing chamber.

In some embodiments, the absorber includes a surface having a high absorptivity of solar radiation greater than about 0.9, and a low emissivity of less than about 0.1 in the visible to infrared range.

In some embodiments, each of the mini channels has a hydraulic diameter in a range of approximately 10 millimeters to approximately 200 micrometers.

In some embodiments, each of the mini channels has a hydraulic diameter in a range of approximately 100 millimeters to approximately 200 micrometers.

In some embodiments, each of the mini channels has a hydraulic diameter in a range of approximately 200 micrometers to approximately 10 millimeters.

Some embodiments include one or more concentrators configured to concentrate solar radiation onto the absorber.

Some embodiments include a heat exchanger in fluid communication with the output port and configured to extract energy from the heat-transfer fluid.

In some embodiments, during operation, the ratio of the area of the absorber receiving solar energy to that of the area of the absorber in contact with the heat transfer fluid is in the range of about 1/pi to about 1/(2*pi).

In another aspect, a solar collector is disclosed including: an evacuated enclosure which is at least partially transparent to solar radiation; an input port for the inflow of a heat-transfer fluid; an output port for the outflow of the heat transfer fluid; a u-shaped absorber within the enclosure, the absorber having first and second elongated portions each having a proximal end, the elongated portions being connected at a distal end by a curved portion; a plurality of mini-channels in the u-shaped absorber each extending between an inflow end located at the proximal end of the first elongated member and outflow end located at the proximal end of the second elongated member. The inflow end of each mini-channel is in fluid communication with the input port and the outflow end outflow end of each mini-channel is in fluid communication with the output port.

In some embodiments, each mini-channel is configured to: receive heat transfer fluid from the input port, and direct heat transfer fluid through the channel along the first elongated member, through the curved portion, along the second elongated member, and to the output port.

Some embodiments include a fluid input connection including: an opening for receiving in fluid-tight connection the proximal end of the first elongated member; and a passage in fluid communication with the input port and the inflow ends of the plurality of mini channels located at the proximal end of the first elongated member, such that fluid input into the input port will flow through the passage into the inflow ends of the plurality of inflow mini channels.

Some embodiments include a fluid output connection including: an opening for receiving in fluid-tight connection the proximal end of the second elongated member, a passage in fluid communication with the output port and the respective outflow ends of the plurality of mini channels located at the proximal end of the second elongated member, such that fluid from the respective outflow ends will flow through the passage into the output port.

In some embodiments, the first and second elongated members are substantially flat members, and where the respective openings in the fluid input connection and fluid output connection are formed as slits.

In another aspect, a solar collector is disclose including: an evacuated enclosure which is at least partially transparent to solar light; an input port for the inflow of a heat-transfer fluid; an output port for the outflow of the heat transfer fluid; an absorber within the enclosure. The absorber includes: first and second elongated surfaces facing each outer and extending from a proximal end to a distal end; and a plurality of fins extending between the first surface and the second surface, the fins defining a plurality of mini channels each extending between an inflow end located at the proximal end of the surfaces and outflow end located at the distal end of the surfaces. The inflow end of each mini-channel is in fluid communication with the input port and the outflow end outflow end of each mini-channel is in fluid communication with the output port.

In some embodiments, the first elongated surface is a tubular surface disposed about a longitudinal axis; the second elongated surface is a tubular surface disposed about the first elongated surface, and the second elongated member; and the plurality of fins extend substantially radially outward from the first elongated surface to the second elongated surface.

In some embodiments, the first and second elongated surfaces are concentric cylinders.

In some embodiments, the plurality of fins are substantially rigid members which provide mechanical support between the first and second elongated surfaces.

In some embodiments, the plurality of fins are arranged in a corrugated pattern between the first and second elongated surfaces.

In some embodiments, the plurality of fins are formed as a corrugated sheet located between the first and second elongated surfaces.

In another aspect, a method is disclosed including: providing a solar collector including: an evacuated enclosure which is at least partially transparent to solar light; an input port for the inflow of a heat-transfer fluid; an output port for the outflow of the heat transfer fluid. The method also includes providing an absorber within the enclosure including: a mixing chamber, a plurality of inflow mini-channels each extending between an inflow end in fluid communication with the input port and an outflow end in fluid communication with the mixing chamber, and a plurality of outflow mini-channels each extending between an inflow end in fluid communication with the mixing chamber, and an outflow end in fluid communication with output port. The method further includes receiving solar radiation incident through the enclosure to heat the absorber; flowing heat-transfer fluid from the input port, through the inflow mini channels to the mixing chamber, such that the heat-transfer fluid absorbs heat from the absorber; outputting the fluid from the inflow mini-channels into the mixing chamber; mixing the fluid in the mixing chamber; and flowing the mixed fluid through the outflow mini-channels to the output port.

Some embodiments include directing the fluid from the output port to a heat-exchange system.

Some embodiment include concentrating solar radiation onto the absorber.

In another aspect a method is disclosed including: providing a solar collector including: an evacuated enclosure which is at least partially transparent to solar light; an input port for the inflow of a heat-transfer fluid; an output port for the outflow of heat transfer fluid; a u-shaped absorber within the enclosure, the absorber having first and second elongated portions each having a proximal end, the elongated portions being connected at a distal end by a curved portion; and a plurality of mini-channels in the u-shaped absorber each extending between an inflow end located at the proximal end of the first elongated member and outflow end located at the proximal end of the second elongated member, where the inflow end of each mini-channel is in fluid communication with the input port and the outflow end outflow end of each mini-channel is in fluid communication with the output port. The method further includes receiving solar radiation incident through the enclosure to heat the absorber; flowing heat-transfer fluid from the input port, through the mini channels, such that the heat-transfer fluid absorbs heat from the absorber; and flowing the heat transfer fluid from the mini-channels to the output port.

Some embodiments include directing the fluid from the output port to a heat exchange system.

Some embodiment include concentrating solar radiation onto the absorber.

In another aspect, a method is disclosed including providing a solar collector including: an evacuated tube; and a mini-channel tube mounted within the evacuated tube, the mini-channel tube including a first plurality of ports for inflow of a heat-transfer fluid and a second plurality of ports for outflow of the heat-transfer fluid to a heat exchange system; where the mini-channel tube includes a plurality of mini-channels, each extending from a respective one of the first plurality of ports for inflow of a heat-transfer fluid to a respective one of the second plurality of ports for outflow of the heat-transfer fluid. The method further includes receiving solar radiation to heat the mini-channel tube; flowing heat-transfer fluid through the mini-channel tube, such that the heat-transfer fluid absorbs heat from the absorber; and flowing the heat transfer fluid from the mini-channel tube to the heat exchange system.

Some embodiments further include exchanging heat from the heat transfer fluid.

Some embodiments further include concentrating solar radiation onto the absorber.

In another aspect, a method of making a solar collector is disclosed including: providing first and second elongated surfaces facing each outer and extending from a proximal end to a distal end; positioning a plurality of fins extending between the first surface and the second surface, joining the fins to the first and second elongated surfaces to form a plurality of mini channels each extending between an inflow end located at the proximal end of the surfaces and outflow end located at the distal end of the surfaces.

In some embodiments, the first elongated surface is a tubular surface disposed about a longitudinal axis; the second elongated surface is a tubular surface disposed about the first elongated surface, and the second elongated member; and the plurality of fins extend substantially radially outward from the first elongated surface to the second elongated surface.

In some embodiments, the first and second elongated surfaces are concentric cylinders.

In some embodiments, the plurality of fins are arranged in a corrugated pattern between the first and second elongated surfaces. In some embodiments, the plurality of fins are formed as a corrugated sheet located between the first and second elongated surfaces.

In some embodiments, joining the fins to the first and second elongated surfaces includes brazing.

In some embodiments, joining the fins to the first and second elongated surfaces includes at least one selected from the list consisting of: welding, gluing, soldering, crimping, mechanically fastening, riveting, and chemically fastening.

Various embodiments may include any of the features described above, either alone or in any combination.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 4 shows a side schematic view of an embodiment of a first mini-channel tube in accordance with a first exemplary embodiment.

FIG. 5 shows a side schematic view of an embodiment of a second mini-channel tube in accordance with a second exemplary embodiment.

FIG. 12a is an exploded side view of the absorber assembly of FIG. 12.

FIG. 12b is a detailed perspective view of the end cap of the absorber assembly of FIG. 12.

FIG. 12c is a head-on view of the end cap of the absorber assembly of FIG. 12.

FIG. 12d is a longitudinal cross section view of the end cap of the absorber assembly of FIG. 12.

FIG. 13a is a detailed perspective view of the end cap of the absorber assembly of FIG. 13.

FIG. 13b is a head-on view of the end cap of the absorber assembly of FIG. 13.

FIG. 13c is a longitudinal cross section view of the end cap of the absorber assembly of FIG. 13.

FIG. 15a is a detailed perspective view of the end cap of the absorber assembly of FIG. 15.

FIG. 15b is a head on view of the end cap of the absorber assembly of FIG. 15.

FIG. 15c is a longitudinal cross section view of the end cap of the absorber assembly of FIG. 15.

FIG. 19a is a perspective view of an embodiment of an absorber.

FIG. 19b is a schematic side view of the absorber of FIG. 19a.

FIG. 20a is a perspective view of an embodiment of an absorber.

FIG. 20b is a schematic side view of the absorber of FIG. 20a.

FIG. 23b is a perspective view of the back side of the connector of FIG. 23a.

FIG. 23c is a longitudinal cross section of the connector of FIG. 23a.

FIG. 27a is a perspective view of an embodiment of an absorber assembly with connectors.

FIG. 27b is a side view of the absorber assembly of FIG. 27a.

FIG. 27c is a top down view of the absorber assembly of FIG. 27a.

FIGS. 28a-d are perspective views showing details of the absorber assembly with connectors of FIG. 27a.

DETAILED DESCRIPTION

Figure 1:
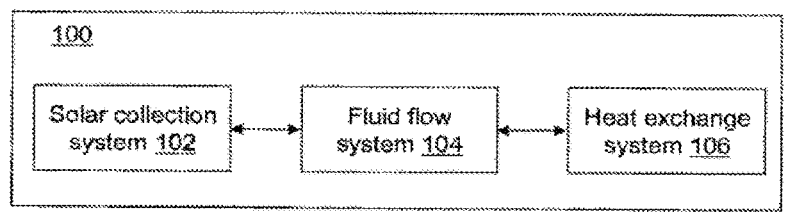
FIG. 1 depicts a block diagram of an embodiment of a solar energy system in accordance with an exemplary embodiment.

With reference to FIG. 1, a block diagram of an embodiment of a solar energy system 100 is shown in accordance with an exemplary embodiment. Solar energy system 100 may include a solar collection system 102, a fluid flow system 104, and a heat exchange system 106. Solar collection system 102 absorbs solar radiation and converts the solar radiation to thermal energy which is transferred to a heat-transfer fluid. Thus, the heat transfer fluid flows through and is heated by solar collection system 102. The heat-transfer fluid may be, for example, water, oil, glycol, or any other suitable heat transfer fluid. Fluid flow system 104 may include a pump and control valves for controlling the flow of the heat-transfer fluid through solar collection system 102 and heat exchange system 106. Heat exchange system 106 converts the thermal energy to electric and/or mechanical energy. For example, heat exchange system 106 may include a water heater, a turbine, an oven, etc. Solar energy system 100 may include additional components as known to those skilled in the art. For example, solar energy system 100 may include a housing to protect the components of solar energy system 100 from environmental elements.

Figure 2:
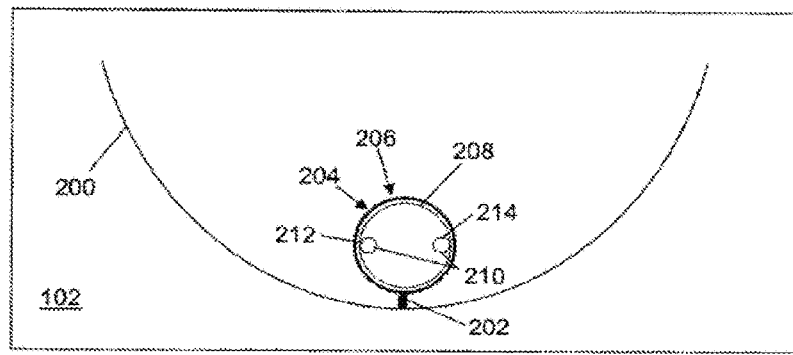
FIG. 2 shows a side schematic view of an embodiment of a solar collection system of the solar energy system of FIG. 1 in accordance with an exemplary embodiment.

With reference to FIG. 2, a side schematic view of an embodiment of a solar collection system 102 is shown in accordance with an exemplary embodiment. Solar collection system 102 may include a solar energy concentrator 200, a connector system 202, and a solar collector 204. Solar energy concentrator 200 may include a variety of mechanisms including mirrors and lens used to collect and to concentrate the solar radiation onto solar collector 204. Solar energy concentrator 200 may be formed of a variety of materials and have a variety of shapes relative to solar collector 204 as known to those skilled in the art. For example, solar energy concentrator 200 may have a trough-like shape. Connector system 202 mounts solar collector 204 to solar energy collector 200 using a variety of mechanisms. As used herein, the term "mount" includes join, unite, connect, associate, insert, hang, hold, affix, attach, fasten, bind, paste, secure, bolt, screw, rivet, solder, weld, and other like terms. For example, connector system 202 may include a stanchion including rods engaging one or more bracket.

Figure 6:
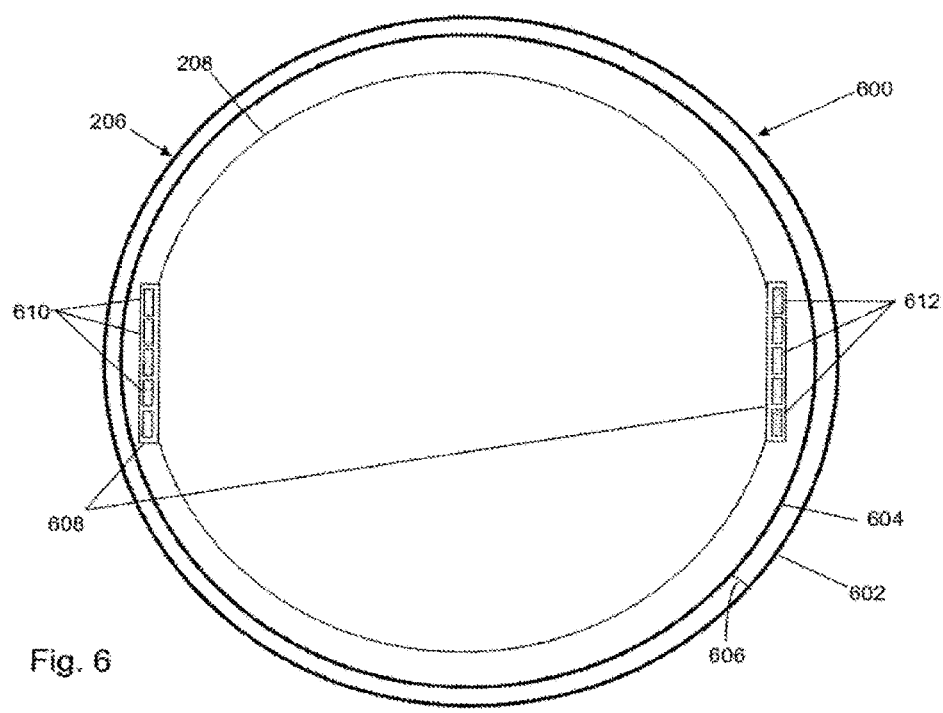
FIG. 6 shows a side schematic view of an embodiment of a second solar collector of the solar collection system of FIG. 2 in accordance with a second exemplary embodiment.

Solar collector 204 may include an evacuated tube 206, an absorber fin 208, and a tube 210. With reference to FIG. 6, evacuated tube 206 is a dual-walled glass vessel formed using a first glass tube 602 and a second glass tube 604. Second glass tube 604 is inserted concentrically into first glass tube 602. First glass tube 602 and second glass tube 604 are closed at one end to form a hemisphere and are fused together at the other end. A hermetically sealed gap 606 between first glass tube 602 and second glass tube 604 is evacuated to avoid heat losses. However, in other embodiments, evacuated tube 206 may be formed of a single wall glass tube. Absorber fin 208 may be a metal absorber formed for example of aluminum, copper, or other metal. Absorber fin 208 is mounted between evacuated tube 206 and tube 210 to facilitate the heat transfer to the heat-transfer fluid flowing in tube 210. Absorber fin 208 may be ultrasound-welded to tube 210 at discrete locations within an external surface of tube 210. Tube 210 may be coated with a coating that promotes absorption of solar radiation incident on solar collector 204. Tube 210 may connect directly to a manifold by means of elongated piercings in a manifold wall through which tube 210 is inserted and bonded to the manifold wall by bracing, welding, etc.

Figure 3:
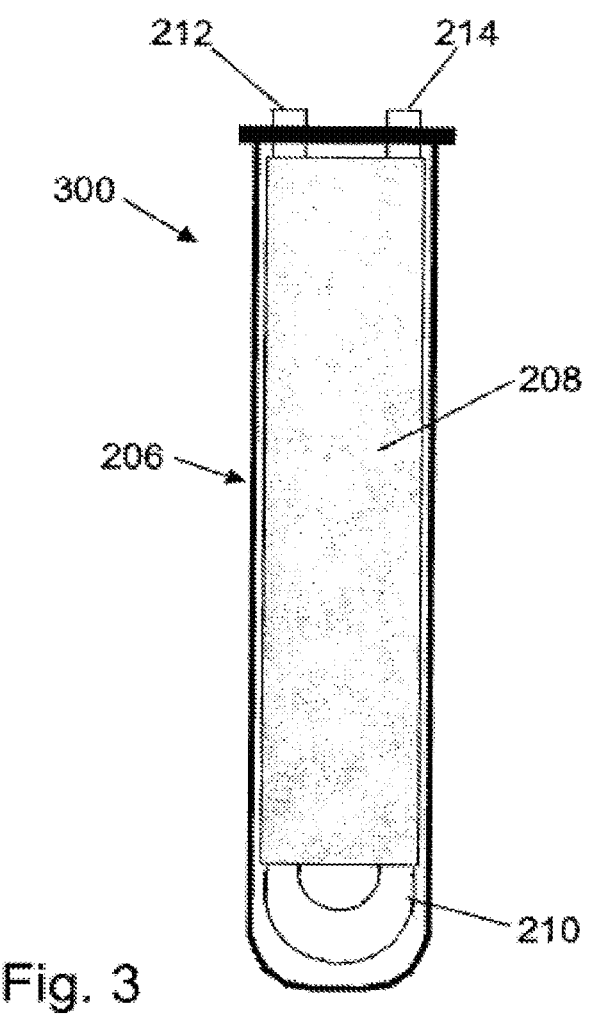
FIG. 3 shows a top schematic view of an embodiment of a first solar collector of the solar collection system of FIG. 2 in accordance with a first exemplary embodiment.

With reference to FIG. 3, a top schematic view of a first embodiment of a solar collector 300 is shown in accordance with an exemplary embodiment. With continuing reference to FIGS. 2 and 3, first solar collector 300 includes a tube 210 that includes a first port 212 for inflow of the heat-transfer fluid to be heated and a second port 214 for outflow of the heated heat-transfer fluid to heat exchange system 106. In the exemplary embodiment of FIG. 3, tube 210 is a U-shaped round tube. Tube 210 may be formed of a variety of materials including aluminum, copper, brass, etc. Other types of tubes may be used without limitation. For example, first solar collector 300 may comprise a counter-flow design which utilizes a coaxial pipe in which the heat-transfer fluid flows through an internal pipe and returns through an external side that is attached to absorber fin 208. First solar collector 300 further may comprise a Dewar collector in which the heat-transfer fluid flows into solar collector 204 through a metal pipe that is open at the end. The heat-transfer fluid flow returns along the internal surface of evacuated tube 206.

With reference to FIG. 4, a side schematic view of first embodiment of a mini-channel tube 400 is shown in accordance with an exemplary embodiment. Second mini-channel tube 400 may include a plurality of ports 402. Second mini-channel tube 400 is characterized by having a major external dimension 406 and a minor external dimension 404 with a free flow area formed by the sum of the cross-sectional areas of the ports. Because the plurality of ports 402 are rectangular in shape, the free flow area is formed by the sum of the areas defined by a width 408 and a height 410 of each of the plurality of ports 402.

With reference to FIG. 5, a side schematic view of a second embodiment of a mini-channel tube 500 is shown in accordance with an exemplary embodiment. Third mini-channel tube 500 may include a plurality of ports 502. Third mini-channel tube 500 is characterized by having a major external dimension 506 and a minor external dimension 504 with a free flow area formed by the sum of the cross-sectional areas of the ports. Because the plurality of ports 502 are circular in shape, the free flow area is formed by the sum of the areas defined by a diameter 508 of each of the plurality of ports 402.

With reference to FIG. 6, a side schematic view of a second embodiment of a solar collector 600 is shown in accordance with an exemplary embodiment. Second solar collector 600 may include evacuated tube 206, absorber fin 208, and a first mini-channel tube 608. In the exemplary embodiment of FIG. 6, first mini-channel tube 608 is a U-shaped mini-channel tube that includes first ports 610 that are rectangular for inflow of the heat-transfer fluid to be heated and second ports 612 that are rectangular for outflow of the heated heat-transfer fluid to heat exchange system 106. First mini-channel tube 608 mounts to absorber fin 208, for example, using brazing, welding, ultra-sound welding, etc. In an exemplary embodiment, the hydraulic diameter of mini-channels includes the range between 3 millimeters (mm) and 200 micrometers (µm). In another exemplary embodiment, the hydraulic diameter of mini-channels may include the range between 200 µm and 10 µm (also known as a micro-channel). The hydraulic diameter is defined as $4A/U$ where A is the cross sectional area and U is the wetted perimeter of the cross-section of first mini-channel tube 608. A mini-channel tube with the same hydraulic diameter as a round tube can have a significantly larger free flow area and a much larger wetted perimeter. The port dimensions tend to be small so that pressure drop is a consideration when analyzing the performance of the mini-channel tube. First mini-channel tube 608 may be formed of a variety of materials including aluminum, copper, brass, etc. First mini-channel tube 608 may include ports having a different shape such as a circular shape, a triangular shape, or non-traditional shapes such as an N-shape, a wall with an extended surface area such as a fin, etc., without limitation. Additionally, the port shapes for a mini-channel tube may have the same or may have different shapes.

Figure 7:
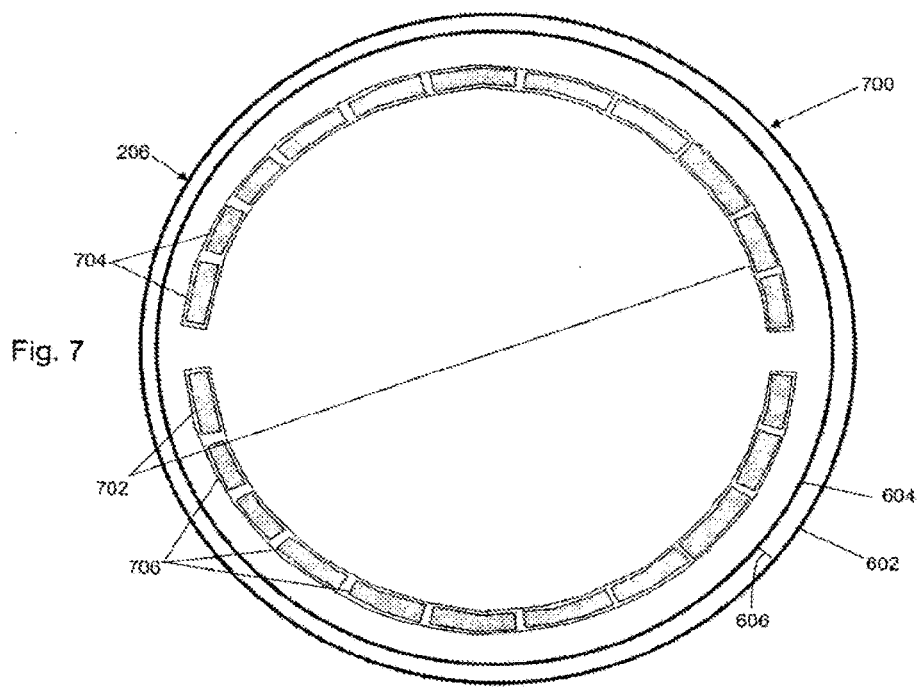
FIG. 7 shows a side schematic view of an embodiment of a third solar collector of the solar collection system of FIG. 2 in accordance with a third exemplary embodiment.

With reference to FIG. 7, a side schematic view of a third solar collector 700 is shown in accordance with an exemplary embodiment. Third solar collector 700 may include evacuated tube 206 and a fourth mini-channel tube 702. In the exemplary embodiment of FIG. 7, fourth mini-channel tube 702 is a U-shaped mini-channel tube that includes first ports 704 that are rectangular for inflow of the heat-transfer fluid to be heated and second ports 706 that are rectangular for outflow of the heated heat-transfer fluid to heat exchange system 106. Fourth mini-channel tube 702 may include ports having a different shape such as circular. Fourth mini-channel tube 702 has a curved major dimension that replaces absorber fin 208. Fourth mini-channel tube 702 may be formed of a variety of materials including aluminum, copper, brass, etc.

First mini-channel tube 608 and fourth mini-channel tube 702 may be configured within evacuated tube 206 in a counter-flow design and/or in a Dewar collector design.

Figure 8:
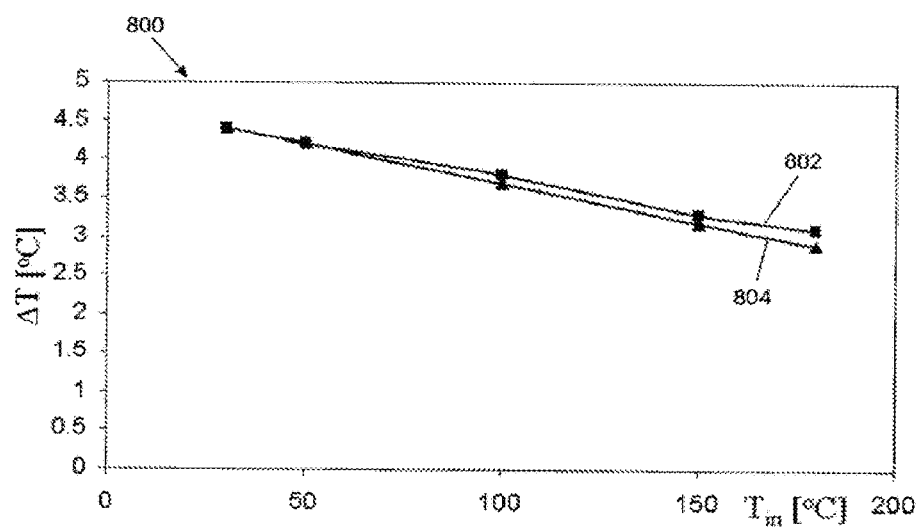
FIG. 8 shows a comparison between the calculated temperature difference of the first embodiment of the solar collector of FIG. 3 and of the second embodiment of the solar collector of FIG. 6 in accordance with an exemplary embodiment.

With reference to FIG. 8, a first comparison graph 800 between the temperature difference between the inlet and the outlet of the first embodiment of a solar collector 300 and of the second embodiment of a solar collector 600 is shown. An x-axis of first comparison graph 800 is a fluid inlet temperature in degrees Celsius, and a y-axis of first comparison graph 800 is a temperature increase at the outlet in degrees Celsius. First comparison graph 800 includes a first curve 802 and a second curve 804 with each curve defined based on five inlet temperature data points. First curve 802 shows the results using second solar collector 600. Second curve 804 shows the results using first solar collector 300. Second solar collector 600 has a slightly better performance than first solar collector 300 mainly at higher operating temperatures with an outlet temperature that is 0.3± degrees Celsius higher as compared to that using first solar collector 300.

In calculating first curve 802 and second curve 804 of first comparison graph 800, evacuated tube 206 was modeled as having an external and internal diameter of 65 mm and 61.8 mm, respectively. The diameter of absorber fin 208 was 56 mm with a length of 1.6 m. Tube 210 and first mini-channel tube 608 were formed of copper pipe having an external diameter of 12 mm with an internal diameter of 10.5 mm. The radiative properties of a selective coating coated on tube 210 and first mini-channel tube 608 was chosen as $\alpha_A$=0:95 and $\varepsilon_A$=0:05. The ambient and sky temperature were considered equal to 25±degrees Celsius. The free flow areas of tube 210 and first mini-channel tube 608 were chosen to be similar at approximately 90 mm² and a volume flow rate of 2 liters per minute was used for the simulations. The major dimension of first mini-channel tube 608 was selected as having half of the length of the circumference of absorber fin 208. The minor dimension was chosen to maintain the same free flow area as that of tube 210.

Figure 9:
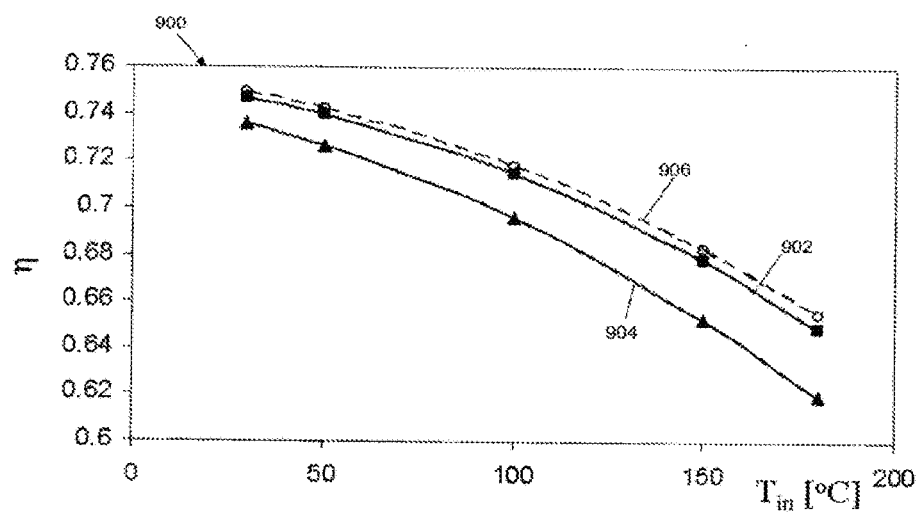
FIG. 9 shows a comparison between the calculated efficiency of the first embodiment of the solar collector of FIG. 3, of the second embodiment of the solar collector of FIG. 6, and of the third embodiment of the solar collector of FIG. 7 in accordance with an exemplary embodiment.

With reference to FIG. 9, a second comparison graph 900 between the efficiency of the first embodiment of a solar collector 300, the efficiency of the second embodiment of a solar collector 600, and the efficiency of the third embodiment of a solar collector 700 is shown. An x-axis of second comparison graph 900 is a fluid inlet temperature in degrees Celsius, and a y-axis of second comparison graph 900 is an efficiency value. Second comparison graph 900 includes a first curve 902, a second curve 904, and a third curve 906 with each curve defined based on five inlet temperature data points. First curve 902 shows the results using second solar collector 600. Second curve 904 shows the results using first solar collector 300. Third curve 906 shows the results using third solar collector 700. The efficiency was calculated as $$\frac{\dot{m}Cp_f(T_{out}-T_{in})}{A_{ge}G_s}$$

where $\dot{m}$ is the mass flow rate, $Cp_f$ is the specific heat of the heat-transfer fluid, $T_{in}$ is the inlet temperature, $T_{out}$ is the outlet temperature, $A_{ge}$ is the area of the external glass, and $G_s$ is the incident radiation.

As indicated in second comparison graph 900, an increase in efficiency of 4.7% was obtained at an inlet temperature of 180± degrees Celsius between second solar collector 600 and first solar collector 300. The improvement in the efficiency decreased with lower operating temperatures. An increase of 1.5% was obtained at $T_{in}$=30± degrees Celsius. Although the free flow area was kept constant, the larger wetted perimeter of first mini-channel tube 608 translated to a smaller hydraulic diameter. This affected the pressure drop through second solar collector 600. Using Darcy's friction factor and without considering the effect of the bend in the U-shaped tube/channels, the pressure drop through second solar collector 600 was shown to be large at low operating temperatures mainly due to the large changes in the value of the viscosity of the heat transfer oil. At $T_{in}$=180± degrees Celsius, the pressure drop of second solar collector 600 was 6.7 times larger than for first solar collector 300.

As indicated in second comparison graph 900, an increase in efficiency of 0.9% was obtained between second solar collector 600 and third solar collector 700. The improvement is expected to be more evident if a collector with a thinner absorber fin was utilized for comparison purposes. However, the performance improvement is not significant enough compared to the much higher pressure drop obtained with the wider fourth mini-channel tube 702 relative to first mini-channel tube 608. Larger tubes also utilize more material so that the cost of the collector may increase. Maintaining the major dimension of the mini-channel tube while increasing the minor dimension, and keeping the wall and web thickness of the mini-channel tube the same may support optimization of the design by allowing a compromise between the pressure drop and tube mass.

Figure 10:
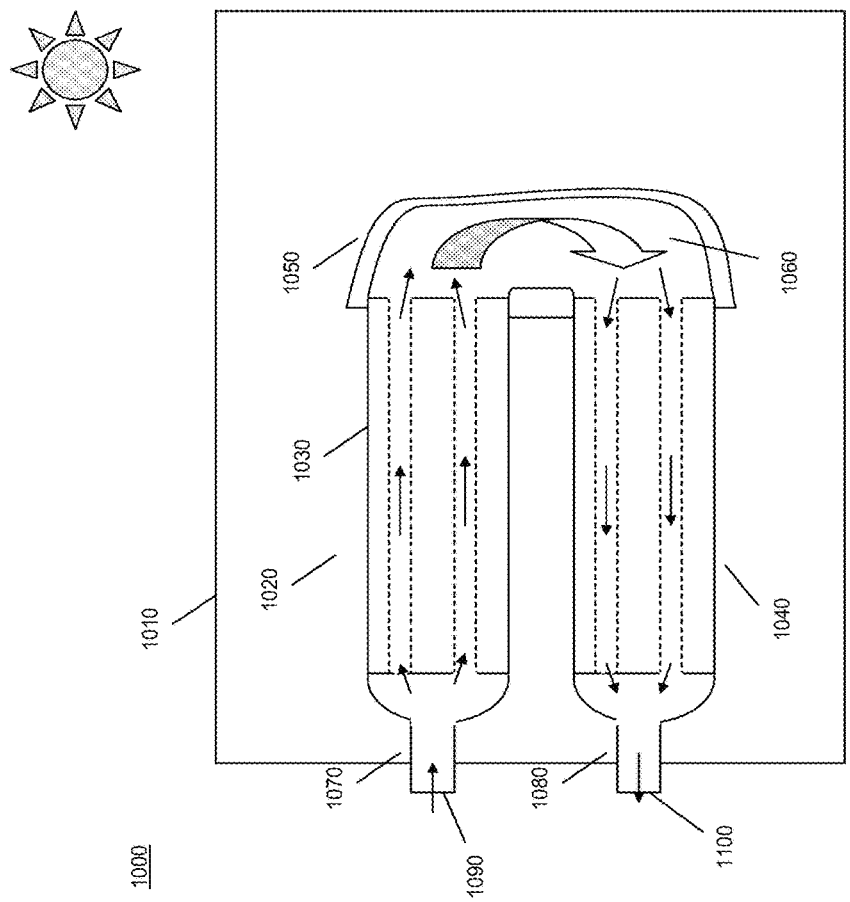
FIG. 10 is a schematic diagram of an embodiment of a solar collector.

Referring to FIG. 10, an embodiment of a solar collector 1000 includes an evacuated enclosure 1010 which encloses an absorber assembly 1020. The Absorber assembly 1020 receives and is heated by solar radiation incident through the enclosure 1010. The assembly 1020 includes an inflow portion 1030, through which inflow mini-channels (indicated with dotted lines) extend. Note that although two mini-channels are shown, and number may be used. The assembly 1020 includes an outflow portion through which outflow mini channels (indicated with dotted lines) extend. Note that although two mini-channels are shown, and number may be used. Assembly 1020 also includes end cap 1050 which defines a mixing chamber 1060. Input connector 1070 provides fluid communication between an input port 1090 and the mini-channels in the inflow portion 1030 of absorber 1020. Output connector 1030 provides fluid communication between an output port 1100 and the mini-channels in the outflow portion 1050 of absorber assembly 1040.

As indicated in the figure by arrows, during operation of collector 1000, a heat-transfer working fluid is input through the input port 1090 and flows into the mini-channels of the inflow portion 1030 of the absorber assemble 1020. The fluid flows through the inflow mini-channels, absorbing heat from the inflow portion 1030 of the absorber assembly 1020. The fluid reaches the end of the mini-channels of inflow portion 1030, and flows into mixing chamber 1060. The heated fluid from the mini-channels mixes in the mixing chamber 1060. In some embodiments, this mixing reduces or removes inhomogeneous heating of the working fluid due to, e.g., uneven distribution of incident solar radiation on the inflow portion 1030 of the absorber assembly 1020.

Fluid from the mixing chamber 1060 flows into the mini-channels of the outflow portion 1040. The fluid flows through the outflow mini-channels, absorbing additional heat from the outflow portion 1040 of the absorber assembly 1020. The fluid flows out of the mini-channels, through output connector 1090 and out through output port 1100. Output port 1100 may be in fluid communication with a heat exchanger (not shown) e.g., using any of the above described techniques.

In solar collectors of the type shown in FIG. 10, it is typically beneficial to reduce or prevent thermal contact between the inflow end of the inflow absorber portion 1030 and the outflow end of the absorber portion 1040. This prevents a thermal short circuit between (relatively cold) fluid entering the absorber assembly 1020 and relatively hot working fluid exiting the absorber assembly 1020.

As shown in FIG. 10, the input port 1090 and output port 1100 are both located on a proximal end of enclosure 1010, with mixing chamber 1060 located near a distal end. This arrangement may provide an advantageously compact form factor, especially when the enclosure 1010 is formed as a tube. However, it is to be understood that any suitable arrangement may be used.

Figure 11:
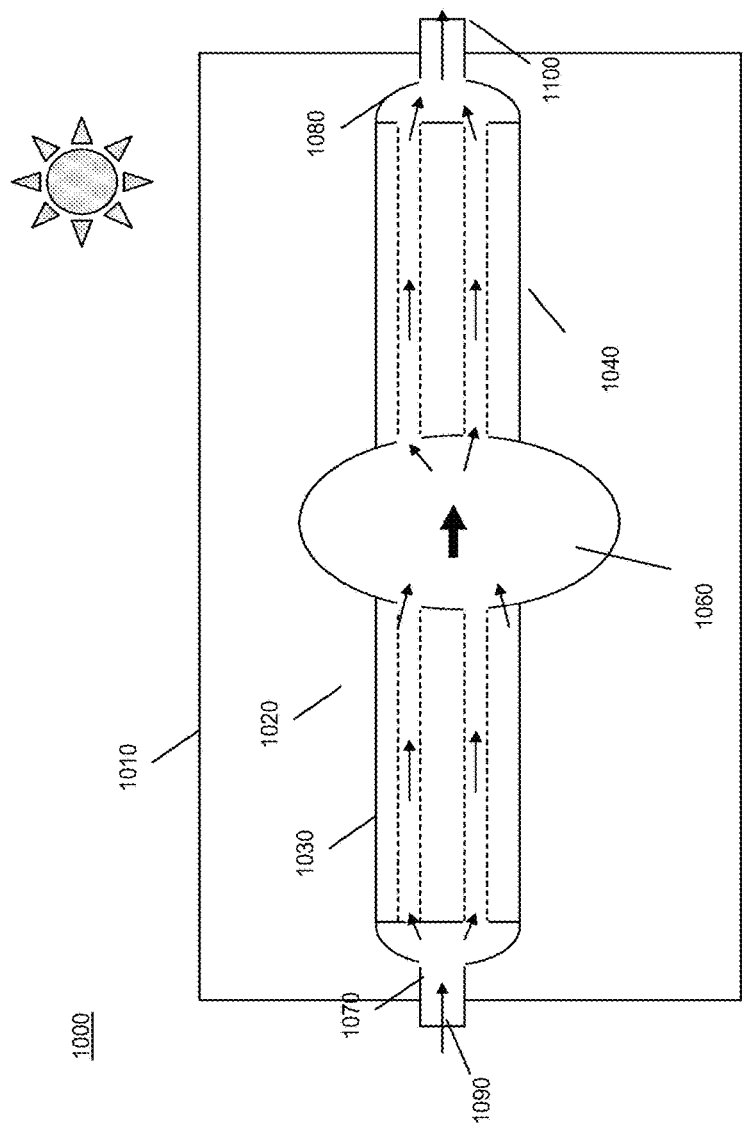
FIG. 11 is a schematic diagram of an embodiment of a solar collector.

For example. FIG. 11 shows an embodiment of a solar collector with the input port 1070 located on the opposite end of the enclosure 1010 from the output port 1090. In this embodiment, the mixing chamber 1060 is located between the input portion 1030 and the output portion 1040 of the absorber assembly 1020. As shown, the mixing chamber 1060 is integral with the inflow and outflow portions 1030, 1040. In other embodiments, the mixing chamber may be a separate component connected by any suitable fixture. As in FIG. 10, the flow of a heat transfer working fluid is shown with arrows.

Figure 12:
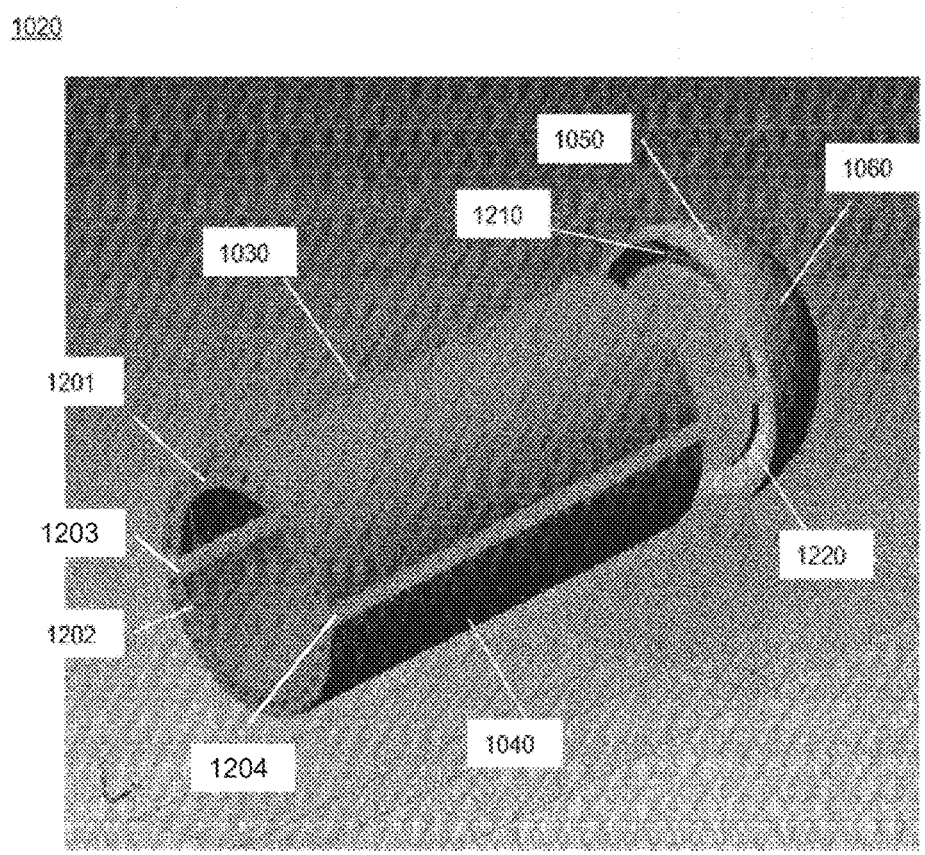
FIG. 12 is an exploded perspective view of an embodiment of an absorber assembly.

FIG. 12 shows an exploded perspective view of an embodiment of an absorber assembly 1020. The inflow and outflow portions 1030, 1040 are each formed a separate sections which do not contact each other. The inflow and outflow portions 1030 and 1040 are formed as elongated members having a curved minor dimension. As shown, the portions 1030, 1040 are substantially half-cylindrical members forming a tubular structure divided by a pair of slits 1203, 1204 running along the complete length of the tubular structure. Inflow mini-channels 1201 run along the length of the inflow portion 1030, and outflow mini-channels 1202 run along the length of outflow portion 1203. Note that the pairs of slits prevent thermal short circuiting between the inflow mini channels 1201 and the outflow mini-channels 1202 at or near the proximal ends of portions 1030 and 1040.

The end cap 1050 is located at a distal end of the inflow and outflow portions 1040. Openings 1210 and 1220 receive and may provide a fluid tight connection with the distal ends of the inflow portion 1030 and the outflow portion 1040, respectively. Mixing chamber 1060 is formed within end cap 1050.

FIG. 12a shows an exploded side view of the absorber assembly 1020 of FIG. 12. The inflow and outflow mini-channels 1201, 1202 running inside the absorber portions 1030 and 1040 respectively, are indicated with dashed lines (two are shown, but any number may be used).

FIG. 12b shows a detailed perspective view of the end cap 1050 of FIG. 12. FIG. 12c shows a head-on, or frontal view and FIG. 12d shows a longitudinal cross section of the end cap 1050. End cap 1050 is formed from inner and outer nested hemispherical members 1240 and 1230 respectively. Mixing chamber 1060 is formed as a volume between the hemispherical members 1240 and 1230. Supports 1250 and 1260 each extend between the hemispherical members 1240 and 1230 to define openings 1210 and 1220. These opening receive the distal ends of the inflow and outflow portions 1030 and 1040 respectively. Openings 1210 and 1220 may have shapes which correspond to the shapes of the distal ends of portions 1030 and 1040, thereby allowing for a fluid tight connection.

As shown, inner hemispherical member 1240 is formed as a solid hemisphere with an open bottom. However, it is to be understood that other suitable configurations may be used.

Figure 13:
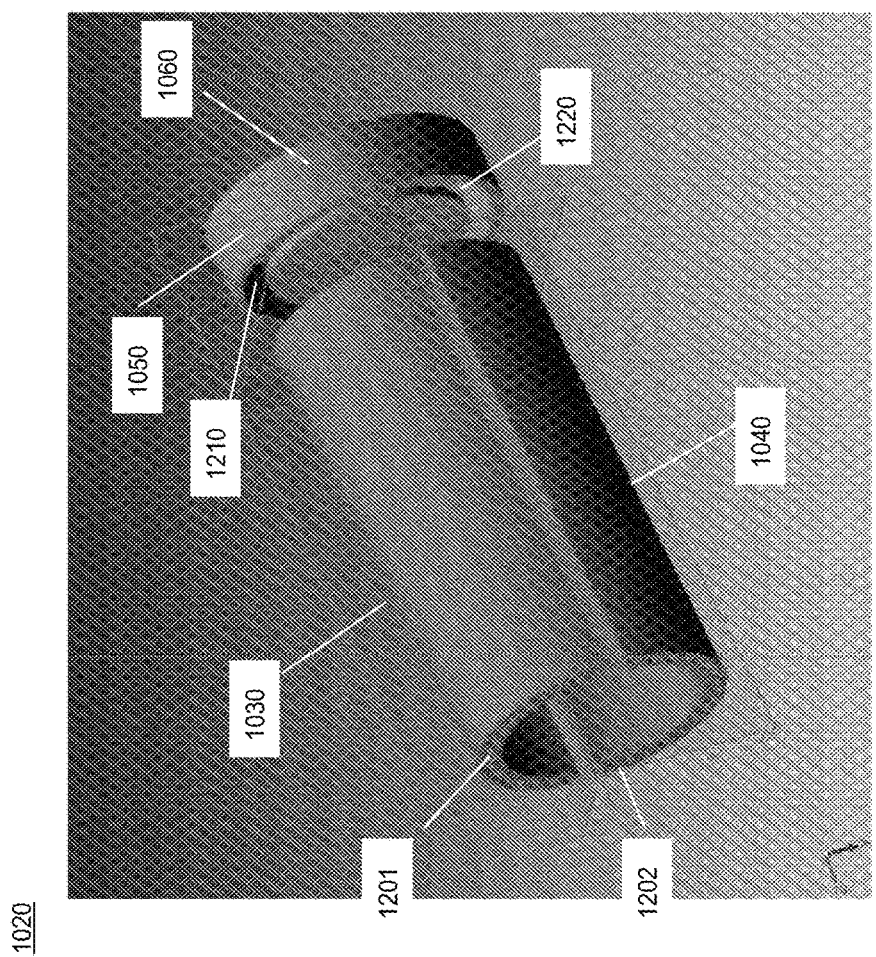
FIG. 13 is an exploded perspective view of an embodiment of an absorber assembly.

FIG. 13 shows an exploded perspective view of an embodiment of an absorber assembly 1020 of the type shown in FIG. 12 and FIGS. 12a-d, but featuring an alternate embodiments of the end cap 1050. FIG. 13b shows a detailed perspective view of the end cap 1050 of FIG. 13. FIG. 13c shows a head-on, or frontal view and FIG. 13d shows a longitudinal cross section of the end cap 1050. End cap 1050 is formed from inner and outer nested cylindrical members 1340 and 1330 respectively. Mixing chamber 1060 is formed as a volume between the cylindrical members 1340 and 1330. Supports 1250 and 1260 each extend between the cylindrical members 1340 and 1330 to define openings 1210 and 1220. These opening receive the distal ends of the inflow and outflow portions 1030 and 1040 respectively. Openings 1210 and 1220 may have shapes which correspond to the shapes of the distal ends of portions 1030 and 1040, thereby allowing for a fluid tight connection.

As shown, inner cylindrical member 1340 is formed as a solid cylinder, while outer cylindrical member 1330 is formed as a hollow cylinder with an open bottom. However, it is to be understood that other suitable configurations may be used. Some embodiments of end cape 1050 may feature an inner cylindrical member and an outer hemispherical member (or vise versa). Any other suitable shaped member (regular or irregular), and/or any number of members connected or joined in any suitable fashion may be used.

Figure 14:
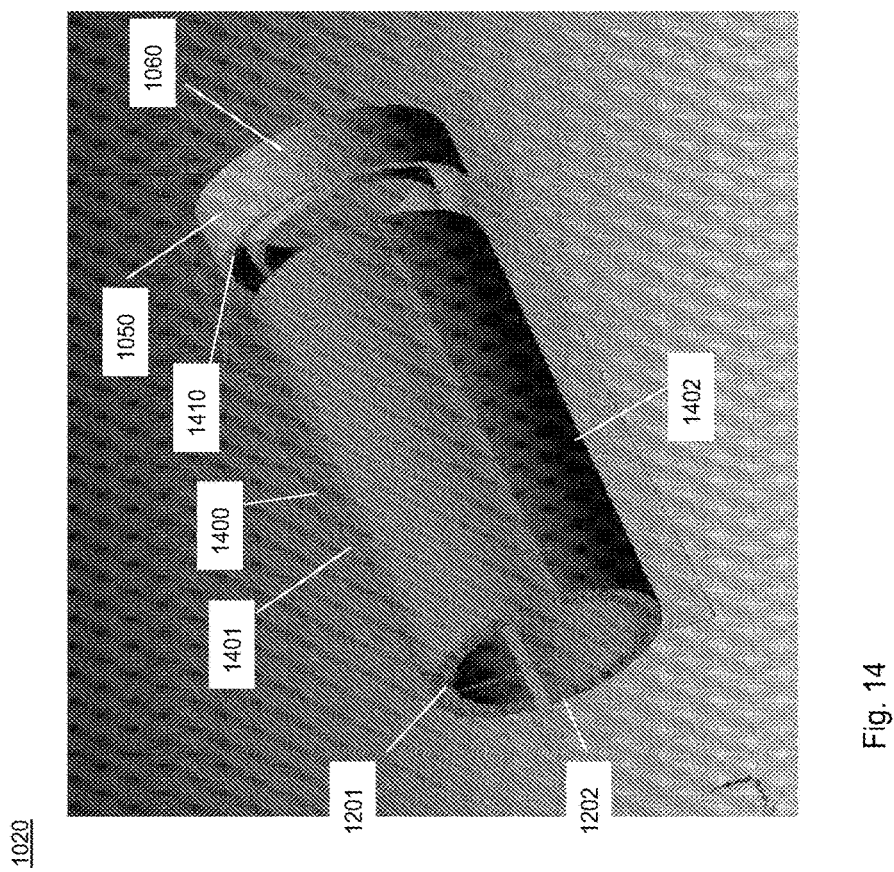
FIG. 14 is an exploded perspective view of an embodiment of an absorber assembly.

FIG. 14 shows an exploded perspective view of another embodiment of an absorber assembly 1020. The separate Inflow and outflow sections 1030 and 1040 have been replaced by an integral inflow/outflow absorber portion. As shown the absorber portion is an elongated tubular member 1400 extending from a proximal end to a distal end which is received by end cap 1050. Tubular member 1400 includes a pair of slits running along its lengths from the proximal end part way towards the distal end. However, the slits do not extend completely along the length, and thus do not divide tubular member 1400 into physically separate sections (as was the case in the embodiments shown in FIGS. 12 and 13). Instead, the pair of slits define a first prong 1401 and a second prong 1402. Prongs 1401 and 1402 are elongated members which are physically separated by the slits along a portion of tubular member 1400, but which connect at the distal end of tubular member 1400.

Figure 14A:
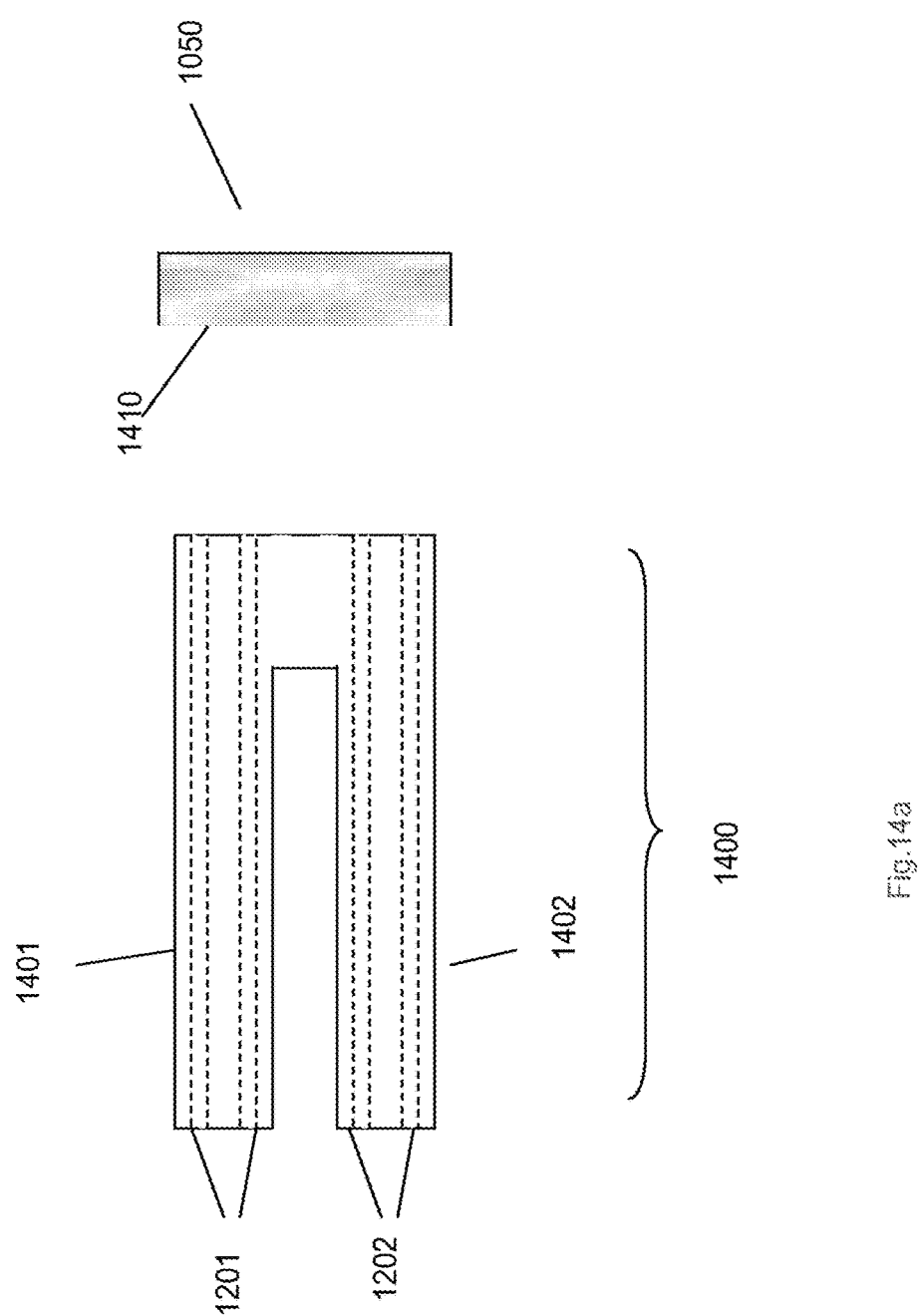
FIG. 14a is an exploded side view of the absorber assembly of FIG. 14.

Inflow mini-channels 1201 are formed in and extend along the first prong 1401. Inflow mini-channels 1201 are formed in and extend along the first prong 1401. Outflow mini-channels 1201 are formed in and extend along the first prong 1402. FIG. 14a shows an exploded side view of the absorber assembly 1020 of FIG. 12. The inflow and outflow mini-channels 1201, 1202 running inside the first and second prongs 1401 and 1402 respectively, are indicated with dashed lines (two mini-channels of each type are shown, but any number may be used).

Note that, because the first and second prongs 1401 and 1402 are separated by the slits at the proximal end of tubular member 1400, thermal short circuit is reduced or prevented between the inflow and outflow mini-channels 1201, 1202 at the proximal end of the tubular member 1401. The separation of first and second prongs 1401 and 1402 at the proximal end of tubular member 1400 is illustrated in the head on view of member 1400 shown in FIG. 1400.

Figure 14C:
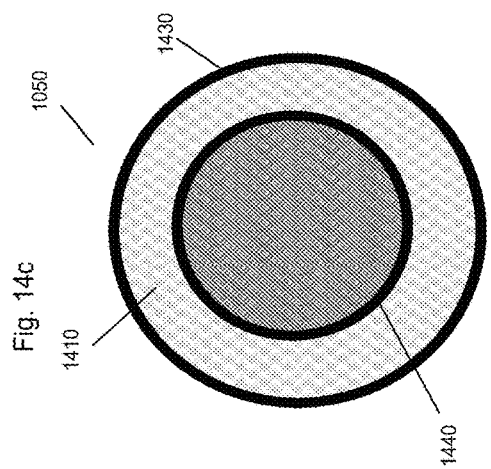
FIG. 14c is a head-on view of the end cap of the absorber assembly of FIG. 14.
Figure 14D:
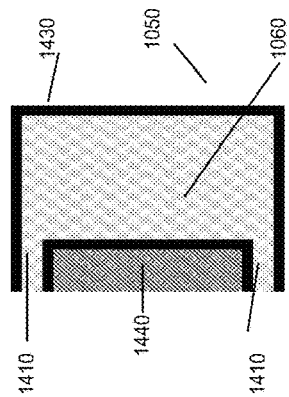
FIG. 14d is a longitudinal cross section view of the end cap of the absorber assembly of FIG. 14.
Figure 14B:
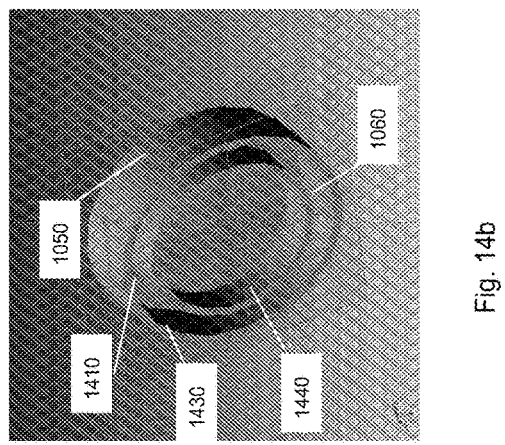
FIG. 14b is a detailed perspective view of the end cap of the absorber assembly of FIG. 14.
Figure 14E:
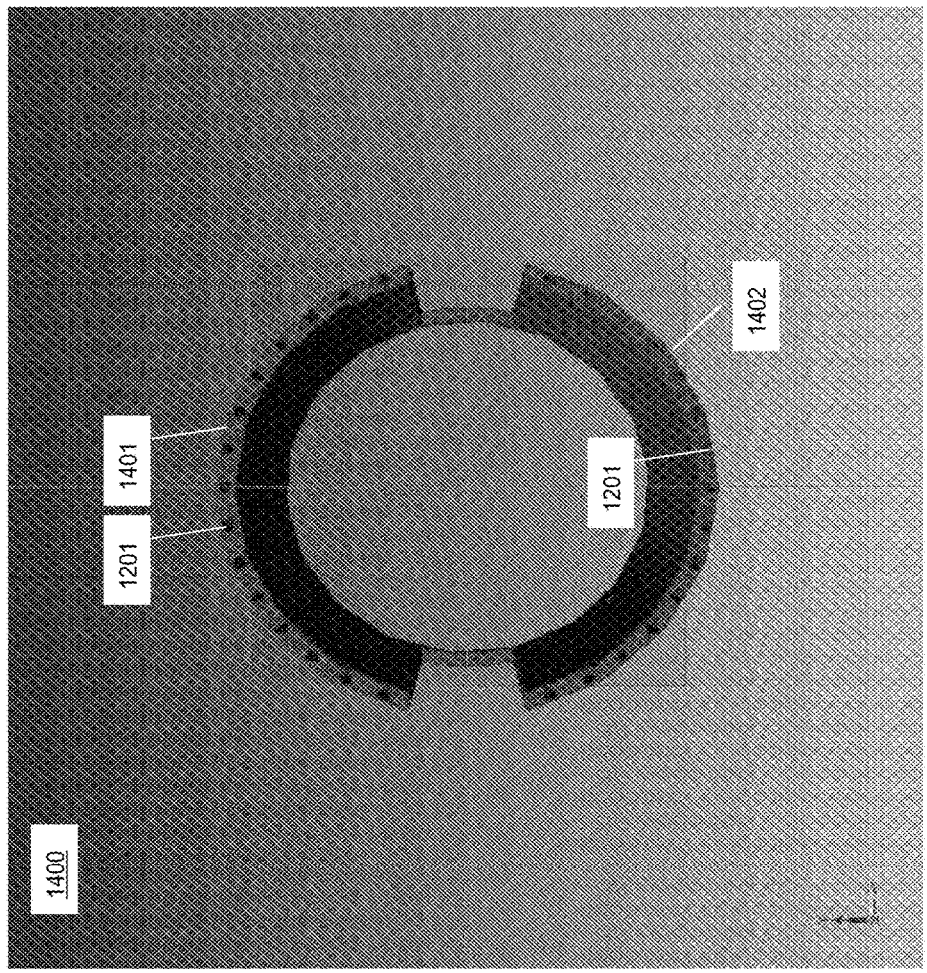
FIG. 14e is a head-on, perspective view of the absorber assembly of FIG. 14.

FIG. 14b shows a detailed perspective view of the end cap 1050 of FIG. 14. FIG. 14c shows a frontal view and FIG. 14d shows a longitudinal cross section of the end cap 1050. End cap 1050 is formed from inner and outer nested cylindrical members 1440 and 1430 respectively. Mixing chamber 1060 is formed as a volume between the cylindrical members 1440 and 1340. Note that supports connecting the cylindrical members are not required in this embodiment. For example, inner cylindrical member 1440 may be received by tubular member 1401 to act as a plug, while outer cylindrical member 1430 fits around the outer surface of tubular member 1400. For example, as shown, tubular member 1400 is a hollow cylindrical tube, and inner cylindrical member fits inside and forms a fluid tight seal with the inner surface of the tube at its distal end. Outer member 1430 is a cylinder which fits over and forms a fluid tight seal with the inner surface of the tube at its distal end.

When so assembled, end cap 1050 includes an opening 1410 which receives the distal end of tubular member 1400. During operation, working fluid flows out of inflow mini-channels 1201 at the distal end of tubular member 1400, mixes in mixing chamber 1060, and flows out through the outflow mini-channels 1202 in the distal end of tubular member 1400.

As shown, the inner and outer cylindrical members 1440 and 1430 are formed as a hollow cylinder with an open bottom and closed top. However, it is to be understood that other suitable configurations may be used. FIG. 15 and FIGS. 15a-c show an embodiment, in which cylindrical members 1440 and 1430 have been replaced with inner and outer hemispherical members 1540 and 1550. Some embodiments of the end cap 1050 may feature an inner cylindrical member and an outer hemispherical member (or vise versa). Any other suitable shaped member (regular or irregular), and/or any number of members connected or joined in any suitable fashion may be used.

Figure 16:
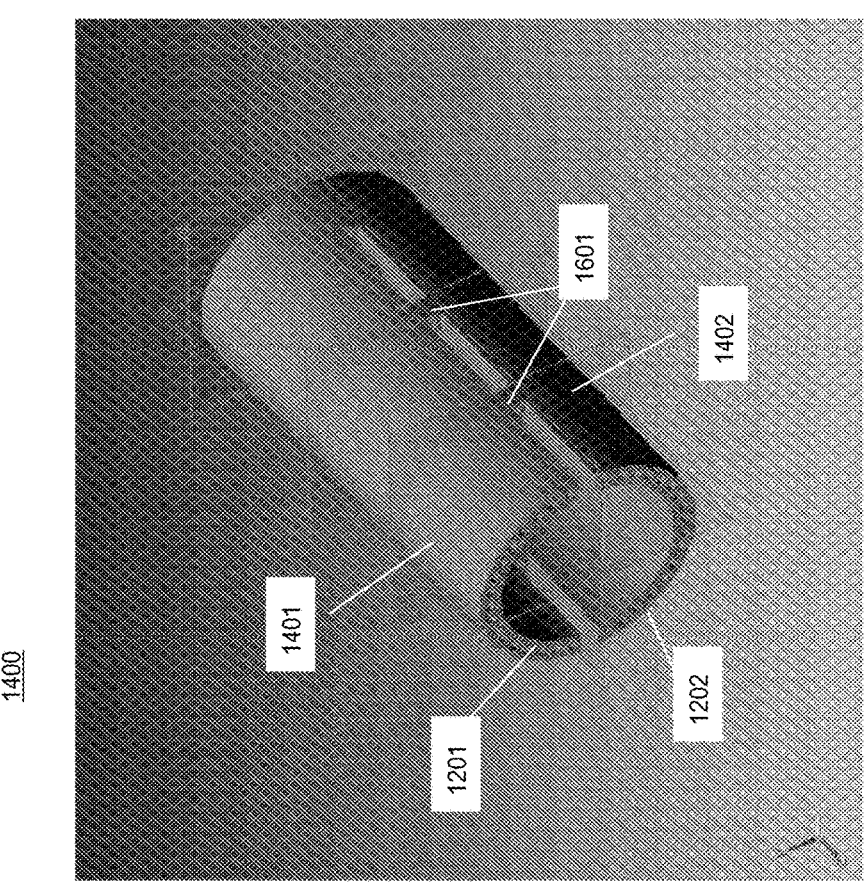
FIG. 16 is a perspective view of an embodiment of an absorber.

FIG. 16 shows a perspective view of another embodiment of a tubular absorbing member 1400, featuring supports 1601 extending between prongs 1401 and 1402. The supports 1601, may be located at any points within the slits separating prongs 1401 and 1402 and may provide mechanical support between the prongs. In some embodiments, it is preferable that the supports are located away from the proximal end of tubular member 1400, so as avoid thermal short circuiting between relatively cold working fluid entering inflow mini-channels 1201 at the proximal end of the first prong 1401 and relatively hot working fluid exiting the outflow mini-channels at the proximal end of the second prong 1402. In some embodiments, supports 1601 may be integral with and/or made of the material as tubular member 1601. In some embodiments, supports 1601 may be made of a thermally insulating material. Although two supports are shown in each of the slits in tubular member 1400, any number may be used.

Figure 15:
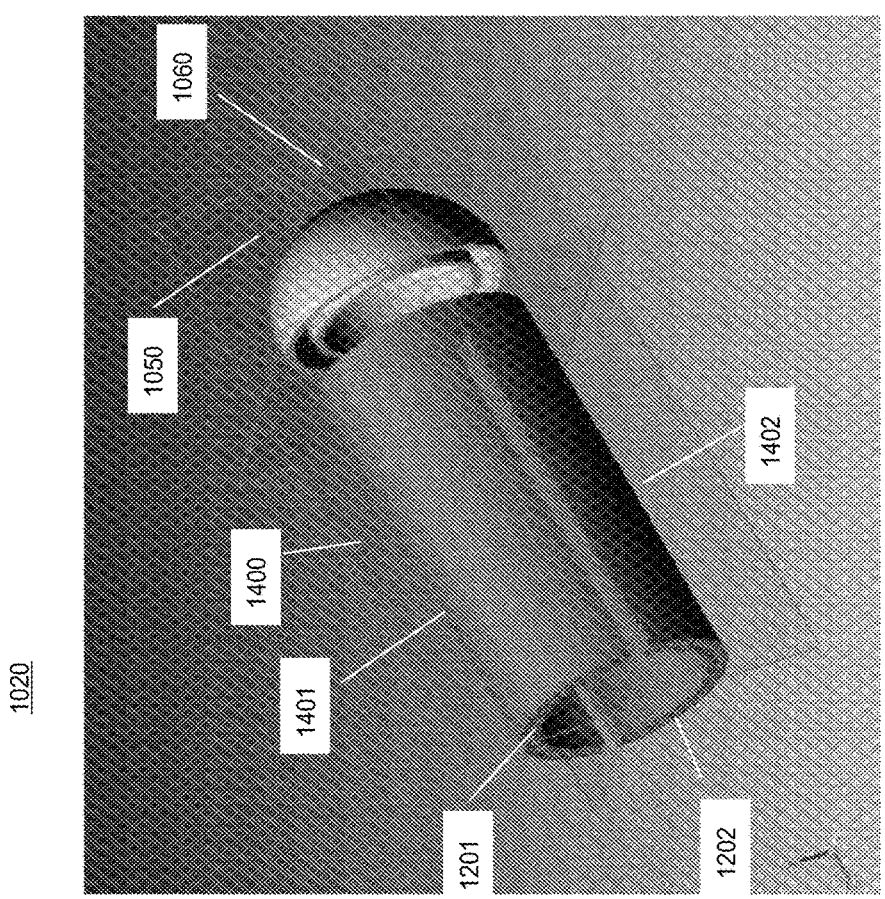
FIG. 15 is an exploded perspective view of an embodiment of an absorber assembly.
Figure 17:
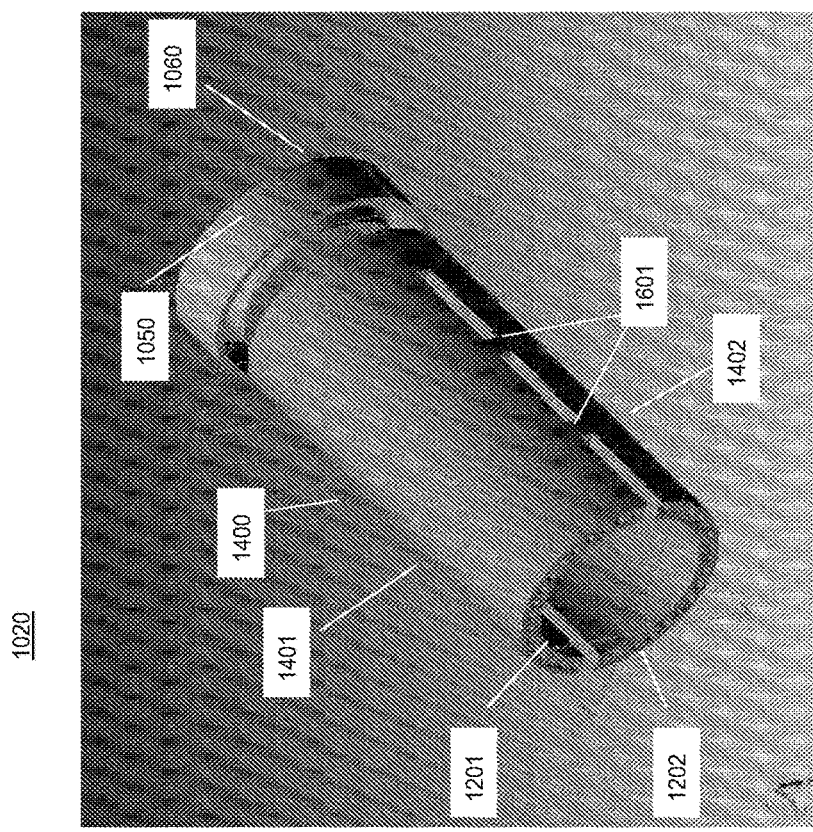
FIG. 17 is an exploded perspective view of an embodiment of an absorber assembly featuring the absorber of FIG. 16.
Figure 18:
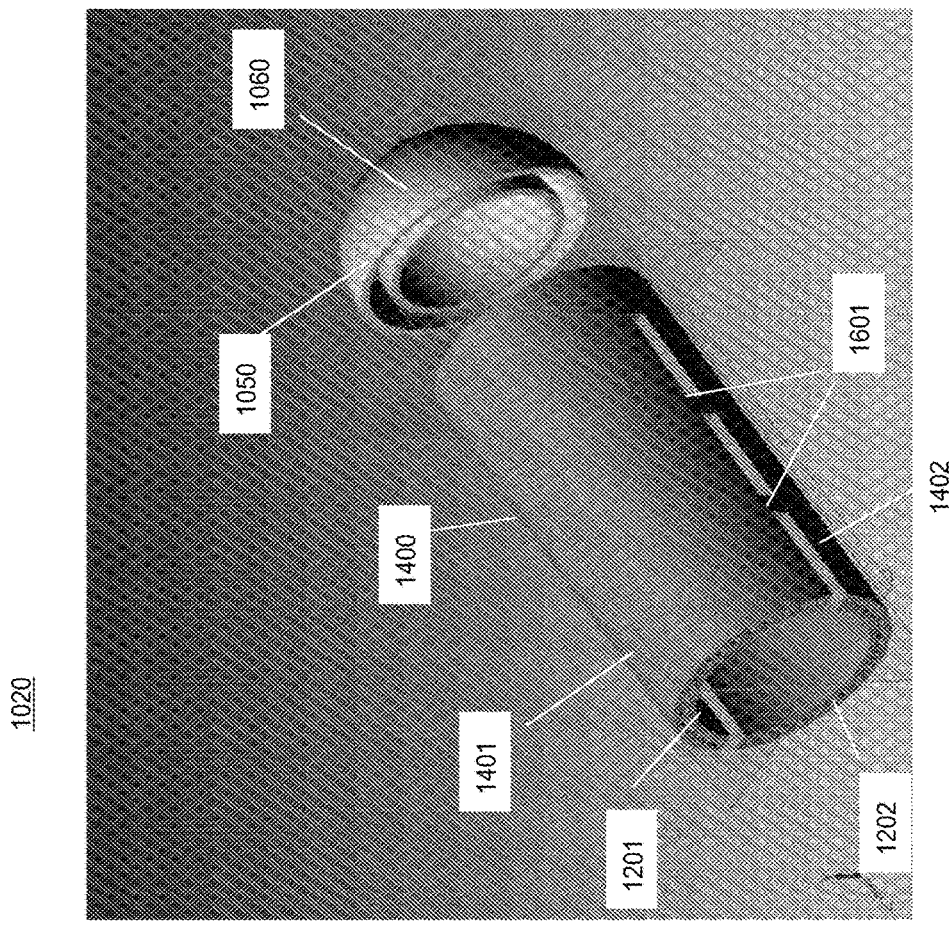
FIG. 18 is an exploded perspective view of an alternative embodiment of an absorber assembly featuring the absorber of FIG. 16.

Note that, because the structure of the distal end of the tubular member 1400 shown in FIG. 16 is not changed by the addition of supports 1601, it is suitable for use with end caps substantially similar to those shown in FIG. 14 through FIG. 15c. For example, FIG. 17 and FIG. 18 show respective embodiments of an absorber assembly featuring a tubular member 1400 with supports 1601 connected to nested cylindrical type end-cap (e.g., similar to that detailed in FIGS. 14b-d) and a nested hemispherical type end cap (e.g., similar to that detailed in FIGS. 15a-c), respectively.

Referring to FIGS. 19a and 19b, in some embodiments, tubular member 1400 (e.g., of the type shown in FIG. 14) includes a second pair of slits extending from the distal end towards the proximal end of member 1400. Accordingly, this first pair of slits defines first and second prongs 1401 and 1402 at the proximal end of member 1400, while the second pair of slits defines a second set of prongs 1901 and 1902 at the distal end of member 1400. As indicated by dashed lines in FIG. 19b, inflow mini-channels 1201 extend along prongs 1401 and 1901, while outflow mini-channels extend along prongs 1402 and 1902. This provides for good thermal isolation of inflow mini-channels 1201 and outflow mini-channels 1202. The prongs come together at and receive mechanical support from a support portion 1910 located between the distal and proximal ends of tubular member 1901.

Referring to FIGS. 20a and 20b, in some embodiments, support portion 1910 may also include one or more silts 1920. These slits may provide additional thermal isolation of inflow mini-channels 1201 and outflow mini-channels 1202.

In some embodiments, support portion 1910 may be integral with and/or made of the same material as tubular member 1910. In some embodiments, supports portion 1910 may be made of a thermally insulating material.

In various embodiments, the tubular member 1400 may include other slits, opening, or similar features. For example, FIGS. 20a and 20b show an embodiment of the tubular member 1400 includes a slits located in support portion 1400 running in the same direction as the slits defining prongs 1401, 1402, 1902, and 1902.

Figure 21:
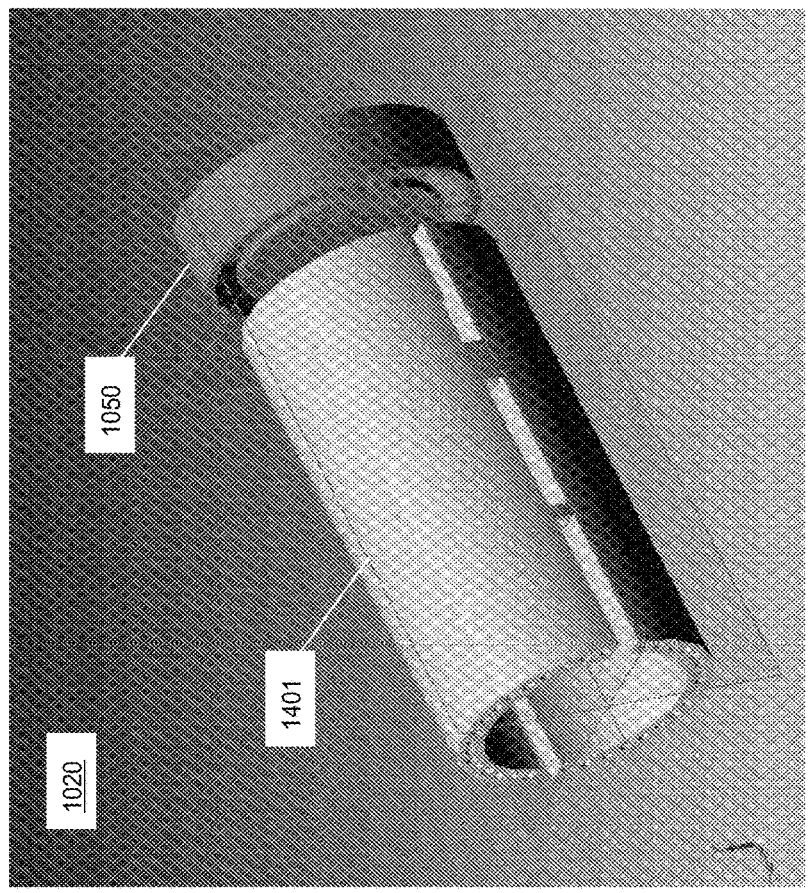
FIG. 21 is an exploded perspective view of an embodiment of an absorber assembly.
Figure 22:
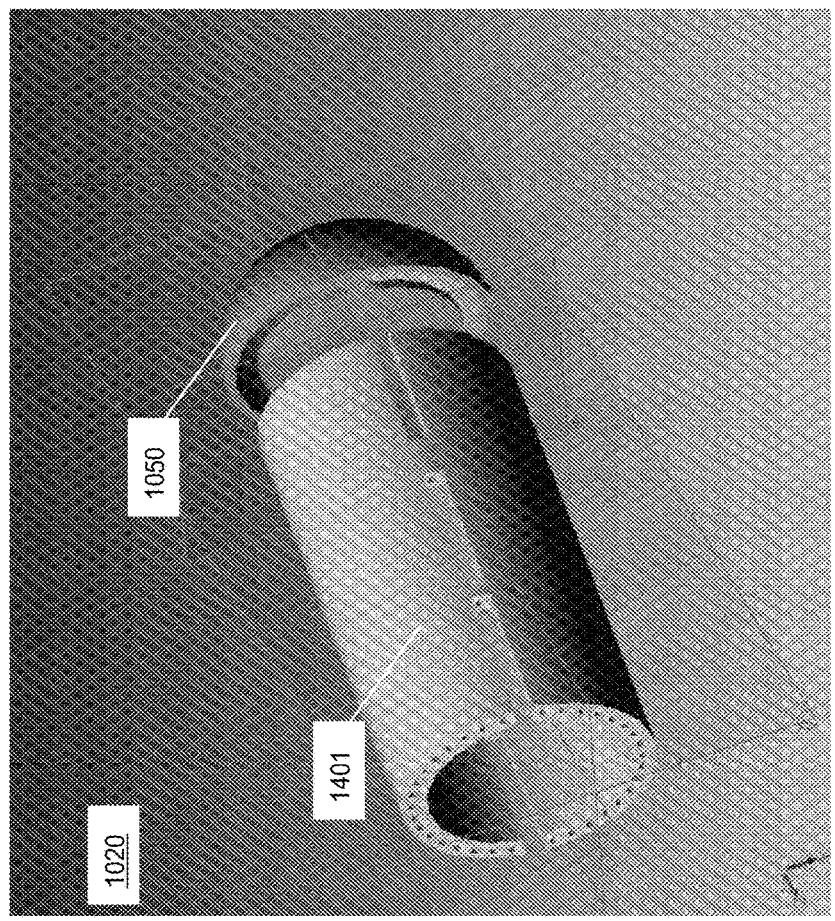
FIG. 22 is an exploded perspective view of an embodiment of an absorber assembly.

Note that the distal ends of the tubular members 1400 shown in FIGS. 19a through 20b have a split tube form similar to that formed by the distal ends of absorber portions 1030 and 140 shown in 12 and 13. Accordingly, these tubular members 14 are compatible with end caps 1050 of the type shown in FIGS. 12b-d and 13b-d. For example, FIGS. 21 and 22 show a tubular member 1400 with distal end prongs 1901 and 1902 connected to nested cylindrical type end-cap (e.g., similar to that detailed in FIGS. 13b-d) and a nested hemispherical type end cap (e.g., similar to that detailed in FIGS. 12a-c), respectively.

As shown in FIGS. 10 and 11, in various embodiments, input and output connectors 1070, 1080 provide fluid communication between inflow/outflow mini-channels 1201, 1201 and fluid input/output ports 1090 and 1100, respectively. In typical embodiments, connectors 1070, 1080 act as manifolds, distributing fluid from a single input or output port to a number on inflow or outflow mini-channels. However, it is to be understood that any suitable of input or output ports may be used.

Figure 23A:
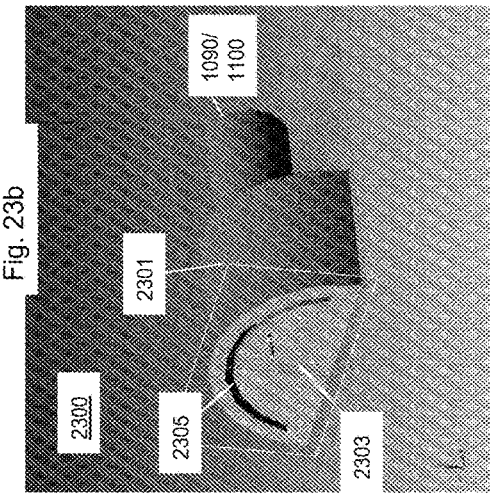
FIG. 23a is a perspective view of the front side of an embodiment of a connector.
Figure 23B:
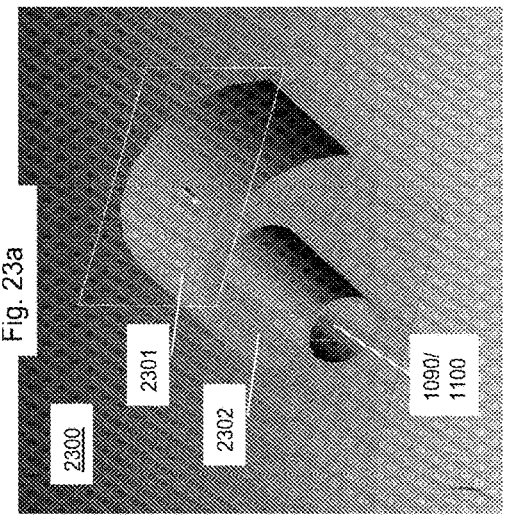
Figure 23C:
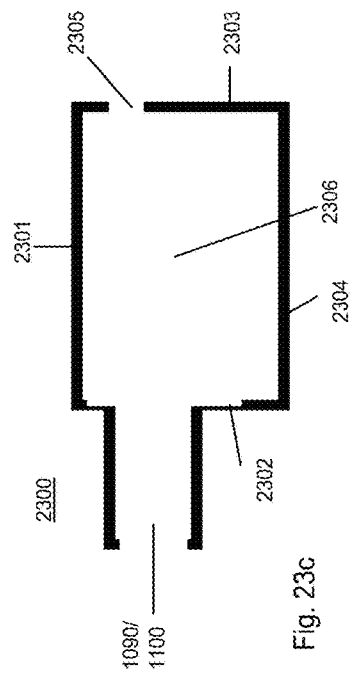
Figure 24A:
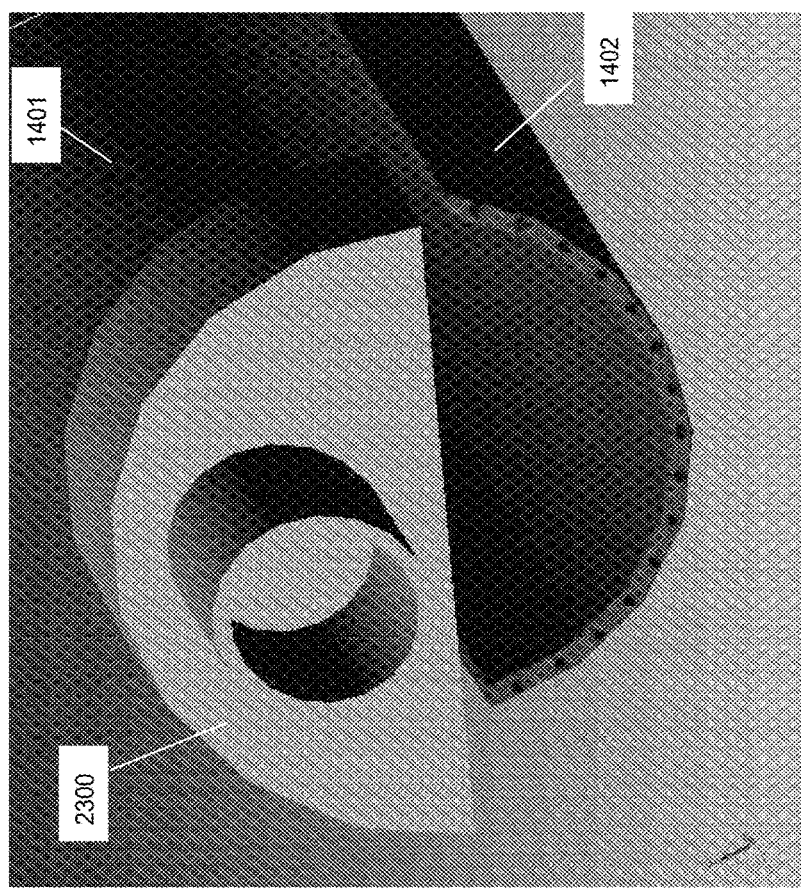
FIG. 24a is a detailed perspective view of the front side of the connector of FIG. 23a connected to an absorber assembly.
Figure 24B:
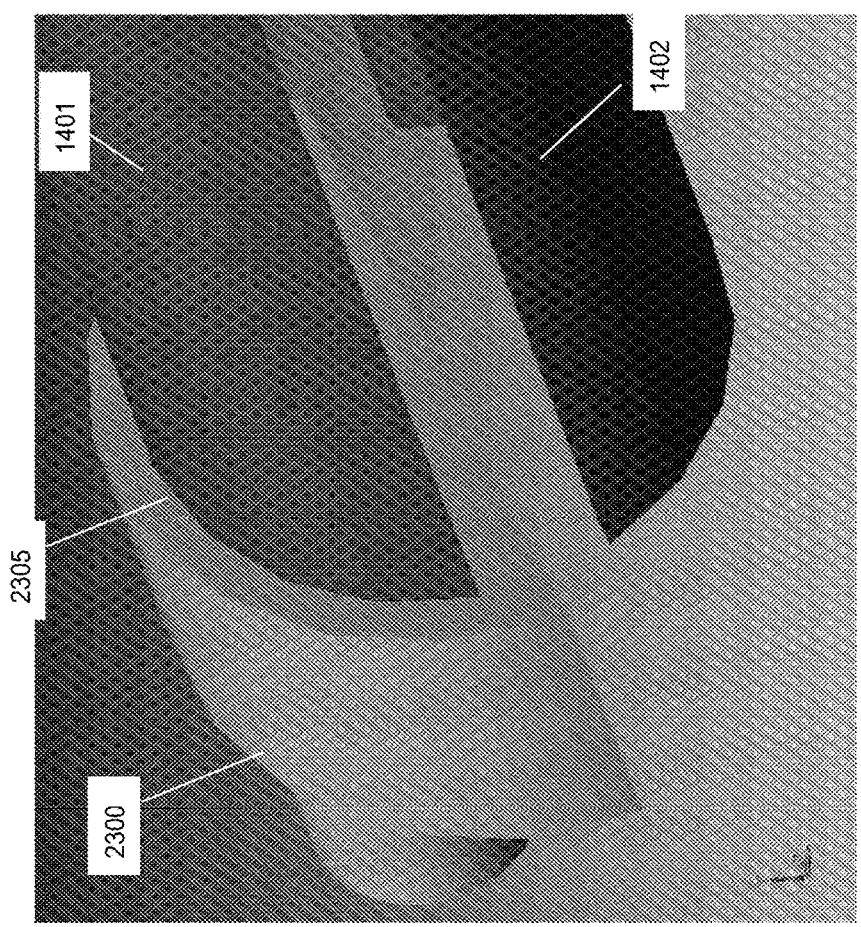
FIG. 24b is a detailed perspective view of the back side of the connector of FIG. 23a connected to an absorber assembly.

FIGS. 23a-23c show respective views of an exemplary half-drum connector 2300 which may be used as an input connector 1070 or output connector with a tubular absorber assembly 1020 of the types described above. The half drum connector 2300 is formed with a curved surface 2301 and base 2304 between front and back end faces 2302 and 2303. Input port 1090 or output port 1100 is mounted on the front end face 2302. A slot type opening 2305 in back end face 2303 receives the distal end of a portion of absorber assembly 1020 which includes the ends of inflow mini-channels 1201 or outflow channels 1202. For example, FIGS. 24a and 24b show half drum connector 2300 receiving prong 1401 of tubular member 1400 in opening 2305. Opening 2305 may have a shape corresponding to that of the member which it receives, thereby allowing fluid tight connection. When so connected, connector 2300 provides a passage 2306 for fluid to flow between the input or output port 1090, 1100 mounted on front end face 2302, and the inflow or outflow mini-channels received in opening 2305

Figure 25:
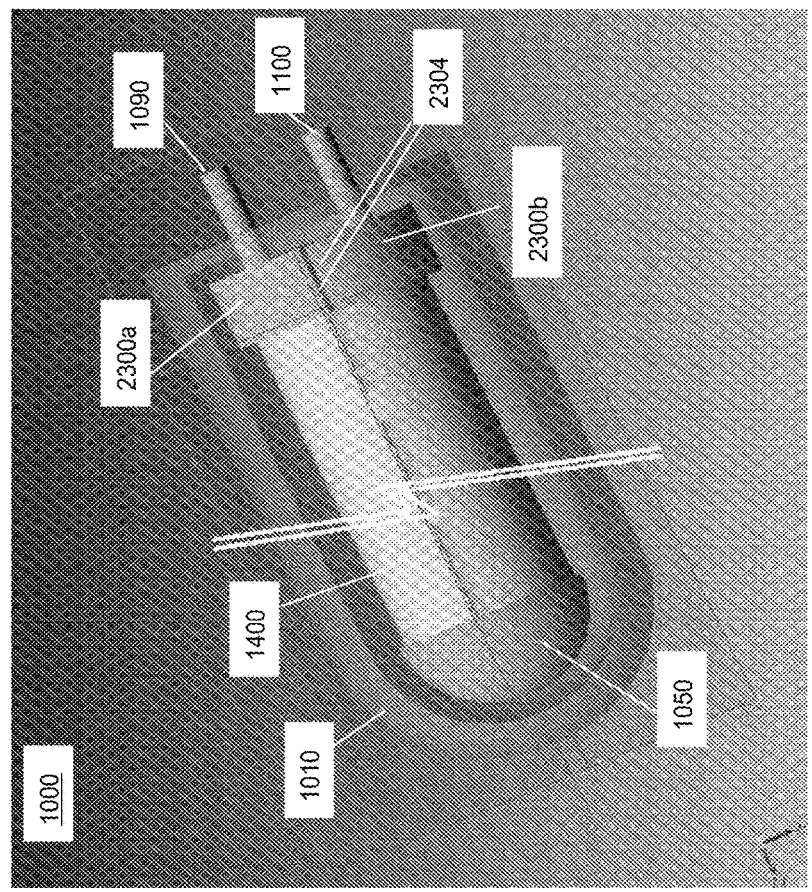
FIG. 25 is a perspective view of an embodiment of a solar collector featuring connectors of the type shown in FIGS. 23a-23b.

Referring to FIG. 25, an embodiment of a solar collector 1000 has an absorber assembly 1050 featuring a tubular member 1400, two half drum connectors 2300a, 2300b may be positioned with their bases 2304 facing each other. This configuration has a compact form factor. Input and output ports 1090 and 1100 are located close to each other at one end of collector 1000, allowing for convenient input and output plumbing connections. Further, curved surfaces 2301 form a cylinder which fits well within a cylindrical evacuated enclosure 1010, as shown. It is to be understood that, for other enclosure shapes, curved surfaces 2301 may take any suitable shape, e.g., that me be substantially conformal to the shape of the enclosure. Note that the slash appearing in FIG. 24 indicates that collector 1000 is typically longer than shown.

Figure 26:
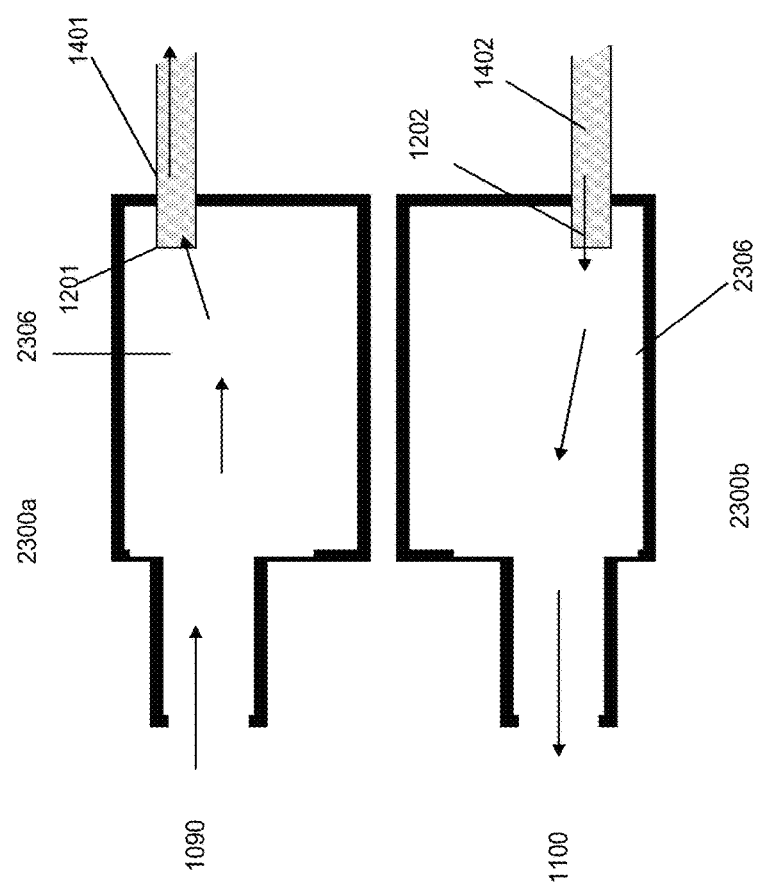
FIG. 26 illustrates the flow of a working fluid through the connectors of FIG. 25.
Figure 28A:
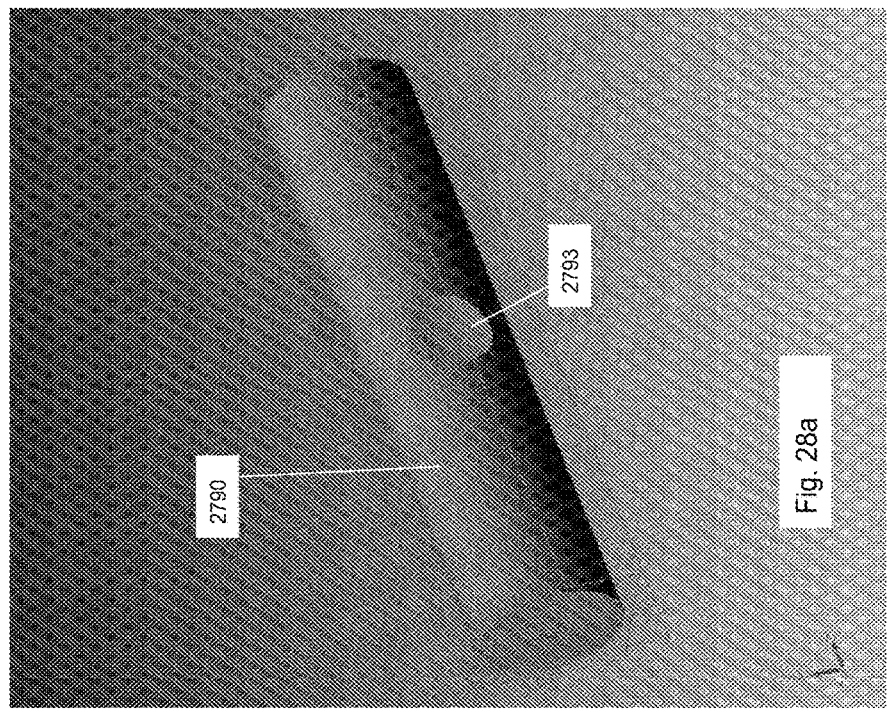
Figure 28D:
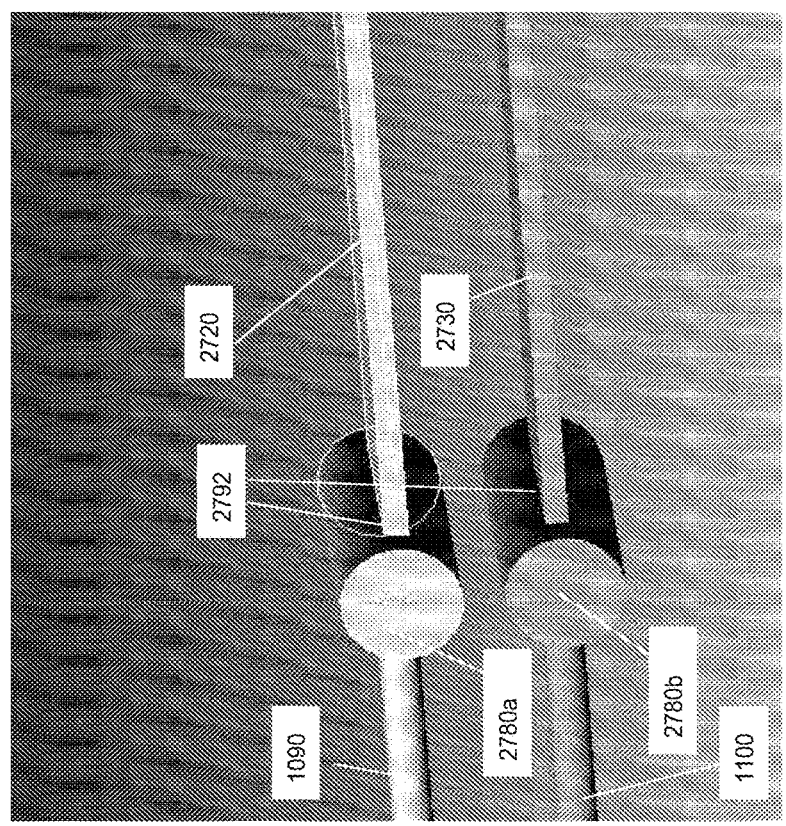

FIG. 26 illustrates the flow (indicated by arrows) of working fluid into and out of the solar collector 1000 of FIG. 25. Working fluid flows into input port 1090, through passage 2306 in half drum input connector 2300a, and into inflow mini-channels 1201 in the proximal end of prong 1401 of tubular member 1400 of absorber assembly 1050. The working fluid flows through the absorber assembly 1050 (not shown) as described above, and flows from the outflow mini-channels 1202 in the proximal end of prong 1401, through passage 2306 of half drum output connector 2300b, and out of output port 1100.

In other embodiments, the input and output connectors 1070 and 1080 may have other form factors suitable for different shapes of absorber assembly 1020. For example, referring to FIGS. 27a-27c absorber assembly 2700 is formed as a flat u-shaped mini-channel tube 2710. The tube 2710 has first and second elongated portions 2720, 2730 each having a proximal end, the elongated portions being connected at a distal end by a curved portion 2740. Mini-channels 2750 (indicated with dashed lines) in the u-shaped tube each extend between an inflow end 2760 located at the proximal end of the first elongated member 2720 and outflow end 2770 located at the proximal end of the second elongated member 2730.

Input and output connectors 2780a and 2780b include elongated cylindrical portions 2790 extending between faces 2791. Input or output ports 1070, 1080 are mounted on cylindrical portion 2790. A slot opening 2792 is located in cylindrical portion 2790 opposite the input or output port. Slot opening 2792 receives one of the proximal ends of portions 2720, 2730. Slot opening 2792 has a shape corresponding to the shape of the ends of portions 2720, 2730, to facilitate fluid tight connection. Input and output connectors 2780a and 2780b each include a passage 2793 placing the ends of mini-channels received in slot opening 2792 in fluid communication with the input and output ports 1090 and 1100, respectively.

FIG. 27d illustrates the flow of working fluid (indicated with arrows). Fluid enters input port 1090 and flows through passage 2793 of input connector 2780a into the inflow ends 2760 of the mini-channels 2750 (one mini-channel is shown, indicated with dashed lines). The working fluid flows through the flat u-shaped tube 2710, out of the outflow ends 2770 of mini-channels 2760. The fluid travels through passage 2793 of input connector 2780b and out through output port 1100.

FIGS. 28a-d show detailed perspective views of input and output connectors 2780a and 2780b. Note that this configuration has a compact form factor. Input and output ports 1090 and 1100 are located close to each other at one end of collector 1000, allowing for convenient input and output plumbing connections.

Figure 29:
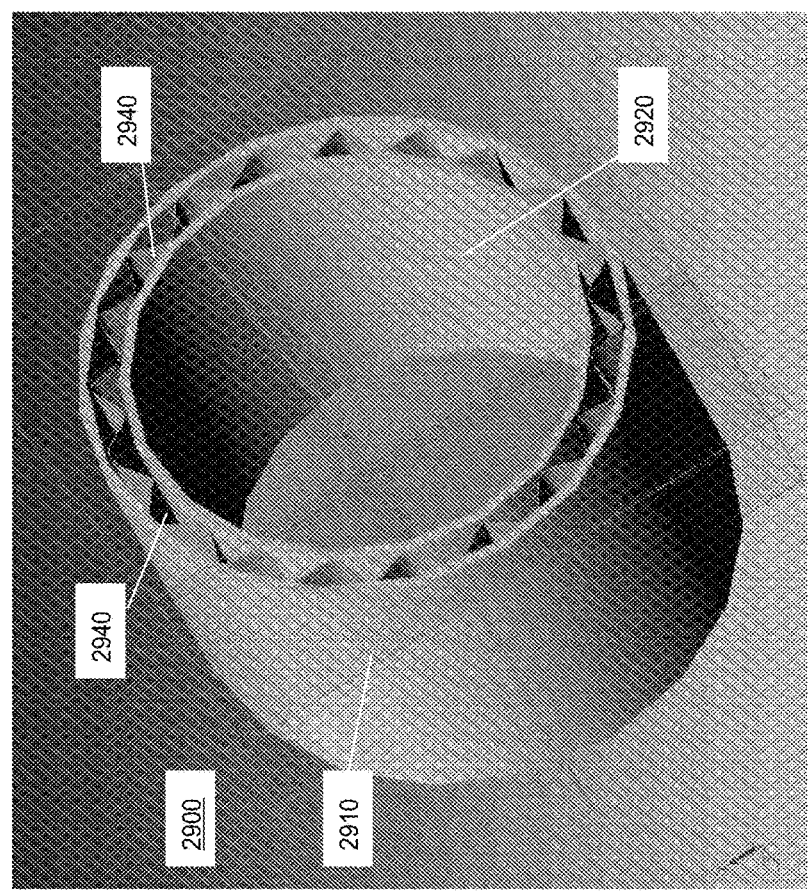
FIG. 29 is a perspective view of an embodiment of an absorber.

FIG. 29 shows an absorber 2900 which includes an outer elongated tubular member 2910 disposed about an inner elongated tubular member 2920. Fins 2930 extend between the outer surface of the inner tubular member 2920 and the inner surface of the outer tubular member 2910, and define mini-channels 2940 extending along the lengths of tubular members 2910 and 2920. Fins 2920 may provide mechanical support between tubular members 2910 and 2920. Absorber 2900 may include any number of slits an openings, e.g., as described in the various examples presented above.

As shown, fins 29 may be arranged in a corrugated pattern, but any suitable pattern may be used. In some embodiments fins 29 are formed from a single corrugated sheet.

Figure 30:
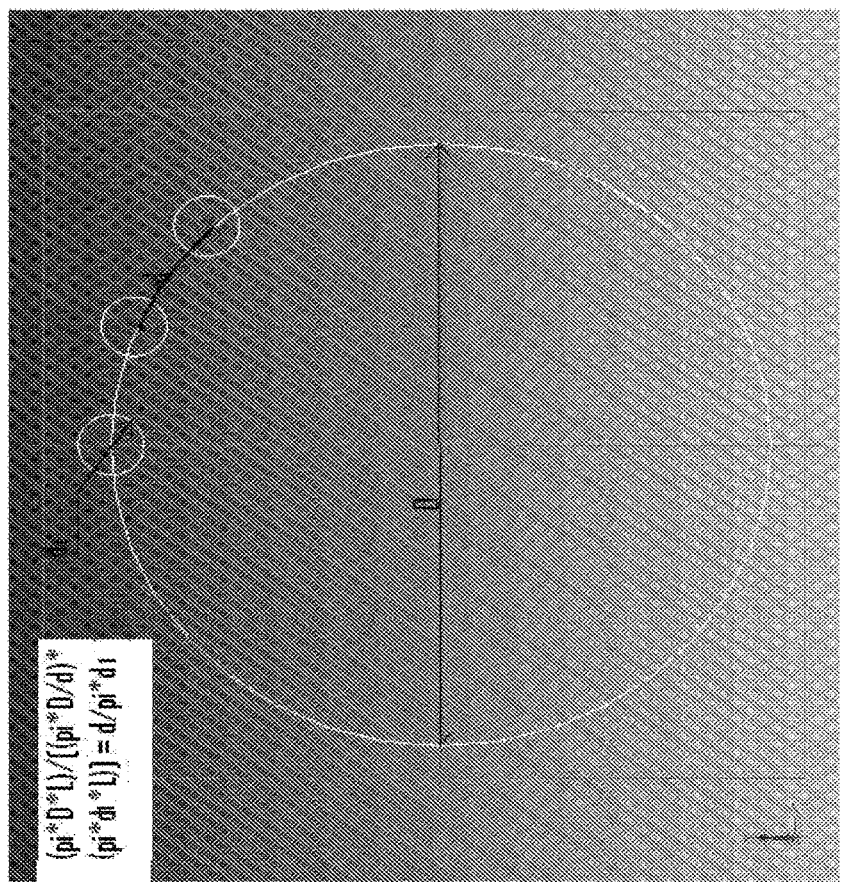
FIG. 30 illustrates an estimate of the ratio of the absorber area illuminated with solar radiation to the area of the absorber which comes in contact with working heat-transfer fluid.

In some embodiments, the ratio of the area of the absorber which receives incident solar energy to the area of the absorber which is in contact with the working fluid may be in the range of about $1/\pi$ to about $1/(2\pi)$. For example, referring to FIG. 30, a cylindrical absorber has a diameter D, and includes cylindrical mini-channels with a diameter $d_1$ arranged around the cylindrical absorber separated by a distance d (center-to-center). In such a configuration the ratio of the area receiving solar energy to that of the area in contact with fluid is approximated as $d/\pi*d_1$ which varies from approximately $1/\pi$ to $1/(2\pi)$. In this particular configuration, the lower limit is approximate and limiting as the length d is that of an arc and not a straight line and also the two consecutive circles touching each other is a limiting case.

In some embodiments, the technique described above may be used to for absorbers having other shapes. For example, a corrugated sheet may be placed between two flat sheets to form a flat mini-channel tube.

Fins 2930 may be attached to tubular members using any suitable technique including brazing, welding, gluing, soldering, etc. Note that the above technique may be used to construct mini-channel absorbers without the need for an extrusion process.

The absorber assemblies and other components, connectors, end caps, etc may be connected or joined to each other using any suitable technique including, for example brazing, welding, gluing, soldering, etc.

In various embodiments, any of the components described above may include coatings or other treatments known in the art to increase absorptivity of solar radiation, and or to minimize emissivity.

The components above may be constructed from any suitable materials including metals, plastics, glasses, etc. As will be understood by those skilled in the art, the particular material choices will depend on the application at hand and the relevant operating parameters (e.g., temperature, temperature variation, environmental conditions, etc).

One or more pumps or other hydraulic, gravity flow, etc., systems may be included to direct the flow of working fluid through the solar collectors described herein. In various embodiments, the working fluid may flows at any suitable rate, e.g., about 1 gallon per hour, 1 gallon per minute, 1 gallon per second, etc.

Although the examples presented above relate to the collection of solar energy, the devices and techniques described herein may be applied to the collection of other types of electromagnetic radiation, e.g., laser radiation.

The devices described herein may be combined with any solar concentrator and/or tracking system know in the art. In various embodiments, such systems may increase the amount of light incident on an absorber, and or may modify the distribution of the incident light (e.g., to provide homogeneous absorption).

Although a number of examples of absorber assemblies have been described above, it is to be understood that other configurations may be used. For example, cylindrical tubular elements may be replaces with elements having other cross sections including elliptical, polygonal, irregular, etc. The various slits and openings described above may take shapes other than those shown, e.g., they may curve as they extend along the various absorbers described above. Absorbers may include any number of slits, prongs, openings, slots, etc. The mini-channels may extend along any suitable path, e.g., straight paths, curved paths, labyrinthine or tortuous paths, irregular paths, etch. The mini-channels may have any suitable crass section, and the cross section may vary along the extent of the mini-channel.

For the purposes of this disclosure and unless otherwise specified, "a" or "an" means "one or more." The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A solar collector comprising:
   an evacuated enclosure, which is at least partially transparent to solar radiation;
   an input port for an inflow of a heat-transfer fluid;
   an output port for an outflow of the heat transfer fluid;
   an end cap comprising a mixing chamber; and
   an absorber within the evacuated enclosure and extending between a distal end and a proximal end, comprising:
      a plurality of inflow mini-channels each extending between a respective inflow end in fluid communication with the input port and a respective outflow end in fluid communication with the mixing chamber,
      a plurality of outflow mini-channels each extending between a respective inflow end in fluid communication with the mixing chamber, and a respective outflow end in fluid communication with the output port, and
      a hollow tube, the hollow tube comprising an outer wall and an inner wall, wherein the plurality of inflow mini-channels and the plurality of outflow mini-channels are within the hollow tube between the inner wall and the outer wall;
   wherein the end cap receives the distal end of the absorber and comprises:
      an outer cap in fluid-tight connection with the outside wall of the hollow tube, and
      an inner plug in fluid-tight connection with the inside wall of the hollow tube; and
   wherein the mixing chamber comprises a volume defined between the outer cap and the inner plug.

2. The solar collector of claim 1, wherein:
   the respective inflow ends of the plurality of inflow mini channels and the respective outflow ends of the plurality of outflow mini channels are located at the proximal end of the tube; and
   the respective outflow ends of the plurality of inflow mini channels and the respective inflow ends of the plurality of outflow mini channels are located at the proximal end of the tube.

3. The solar collector of claim 1, wherein the absorber comprises:
   a first section comprising the plurality of inflow mini channels: and a
   second section comprising the plurality of outflow mini-channels;
   wherein the first and second sections do not contact each other; and
   wherein the end cap comprises a first opening for receiving in fluid-tight connection a distal end of the first section, and a second opening for receiving in fluid-tight connection a distal end of the second section.

4. The solar collector of claim 3, comprising a fluid input connection comprising:
   an opening which receives the proximal end of the first section in fluid-tight connection; and
   a passage in fluid communication with the input port and the respective inflow ends of the plurality of inflow mini channels, such that fluid input into the input port will flow through the passage into the inflow ends of the plurality of inflow mini channels.

5. The solar collector of claim 4, comprising a fluid output connection comprising:
   an opening which receives the proximal end of the second section in fluid-tight connection; and
   a passage in fluid communication with the output port and the respective outflow ends of the plurality of outflow mini channels, such that fluid from the respective outflow ends will flow through the passage into the output port.

6. The solar collector of claim 4 wherein the fluid input connection and the fluid output connection are thermally isolated from each other.

7. The solar collector of claim 1, wherein
   the hollow tube is disposed about a longitudinal axis extending between the distal end to the proximal end,
   the tube comprises a pair of longitudinal slits extending from the proximal end to a point proximal the distal end to define first and second prongs of the tube;
   the plurality of inflow mini-channels extend along the first prong to the respective inflow ends of the plurality of inflow mini-channels located at a proximal end of the first prong, and
   the plurality of outflow mini-channels extend along the second prong to the respective outflow ends of the plurality of outflow mini channels at a proximal end of the second prong.

8. The solar collector of claim 1, wherein the tube is substantially cylindrical, and the outer cap and inner plug comprise nested hemispheres.

9. The solar collector of claim 1, wherein the tube is substantially cylindrical the outer cap and inner plug each comprise nested cylinders.

10. The solar collector of claim 7, comprising a fluid input connection comprising:
    an opening for receiving in fluid-tight connection the proximal end of the first prong, said end comprising the respective inflow ends of the plurality of inflow mini channels; and
    a passage in fluid communication with the input port and the respective inflow ends of the plurality of inflow mini channels, such that fluid input into the input port will flow through the passage into the respective inflow ends of the plurality of inflow mini channels.

11. The solar collector of claim 10, comprising a fluid output connection comprising:
    an opening for receiving in fluid-tight connection the proximal end of the second prong, said end comprising the respective outflow ends of the plurality of outflow mini channels; and
    a passage in fluid communication with the output port and the respective outflow ends of the plurality of outflow mini channels, such that fluid from the respective outflow ends will flow through the passage into the output port.

12. The solar collector of claim 11, wherein the fluid input connection comprises a substantially half cylindrical drum comprising a base surface and a curved radial surface, each surface extending between front and back end faces, wherein the input port is mounted the front end face, the opening for receiving the proximal end of the first prong us located on the back end face, and the passage in fluid communication with the input port and the respective inflow ends of the plurality of inflow mini channels is located within the drum.

13. The solar collector of claim 10, wherein the fluid output connection comprises a substantially half cylindrical drum comprising a base surface and a curved radial surface, each extending between front and back end faces, wherein the input port is mounted to the front end face, the opening for receiving the proximal end of the first prong is located on the back end face, and the passage in fluid communication with the output port and the respective outflow ends of the plurality of inflow mini channels is located within the drum.

14. The solar collector of claim 13, wherein the base surface of the fluid output connection is located proximal to and facing the base surface of the fluid input connection.

15. The solar collector of claim 14, wherein the enclosure comprises a hollow tube having a curved inner surface, and wherein the curved radial surfaces of the fluid input and output connections proximal to and facing the inner surface of the enclosure.

16. The solar collector of claim 7, further comprising one or more supports extending between the first and second prongs and located within one of the longitudinal slits distal the proximal end of the absorber.

17. The solar collector of claim 7, further comprising one or more longitudinal slits extending from the distal end of the tube, wherein
the tube comprises another pair of longitudinal slits extending from the distal end to a point distal the proximal end to define third and fourth prongs of the tube, the
plurality of inflow mini-channels extend along the third prong to the respective outflow ends of the plurality of inflow mini-channels located at a distal end of the third prong, and
the plurality of outflow mini-channels extend along the fourth prong to the respective inflow ends of the plurality of outflow mini channels at a distal end of the fourth prong.

18. The solar collector of claim 17 wherein the end cap comprises:
a first opening which receives the proximal end of the third prong to form a fluid-tight connection with the mixing chamber; and
a second opening which receives the proximal end of the fourth prong to form a fluid-tight connection with the mixing chamber.

19. The solar collector of claim 1, wherein the absorber comprises a surface having a high absorptivity of solar radiation greater than about 0.9, and a low emissivity of less than about 0.1 within the visible to infrared range.

20. The solar collector of claim 1, wherein each of the mini channels has a hydraulic diameter in a range of approximately 10 millimeters to approximately 200 micrometers.

21. The solar collector of claim 1, wherein each of the mini channels has a hydraulic diameter in a range of approximately 100 millimeters to approximately 200 micrometers.

22. The solar collector of claim 1, wherein each of the mini channels has a hydraulic diameter in a range of approximately 200 micrometers to approximately 10 millimeters.

23. The solar collector of claim 1, further comprising one or more concentrators configured to concentrate solar radiation onto the absorber.

24. The solar collector of claim 1, further comprising a heat exchanger in fluid communication with the output port and configured to extract energy from the heat-transfer fluid.

25. The solar collector of claim 1, wherein, during operation, the ratio of the area of the absorber receiving solar energy to that of the area of the absorber in contact with the heat transfer fluid is in the range of about $1/pi$ to about $1/(2*pi)$.

26. A solar collector comprising:
an evacuated enclosure which is at least partially transparent to solar radiation;
an input port for an inflow of a heat-transfer fluid;
an output port for an outflow of the heat transfer fluid;
a u-shaped absorber within the enclosure, said absorber having first and second elongated portions each having a proximal end, the elongated portions being connected at a distal end by a curved portion, wherein the u-shaped absorber extends between a distal end and a proximal end and comprises a hollow tube disposed about a longitudinal axis extending between the distal end to the proximal end, and the hollow tube comprises an outer wall, an inner wall, and a pair of longitudinal slits extending from the proximal end to a point proximal the distal end to define first and second prongs of the hollow tube;
one or more supports extending between the first and second prongs and located within one of the longitudinal slits distal the proximal end of the absorber; and
a plurality of mini-channels in the u-shaped absorber each extending between an inflow end located at the proximal end of the first elongated member and outflow end located at the proximal end of the second elongated member,
wherein the inflow end of each mini-channel is in fluid communication with the input port and the outflow end of each mini-channel is in fluid communication with the output port, and wherein the plurality of mini-channels are within the hollow tube between the inner wall and the outer wall.

27. The solar collector of claim 26, wherein each mini-channels is configured to: receive
heat transfer fluid from the input port; and
direct heat transfer fluid through the channel along the first elongated member, through the curved portion, along the second elongated member, and to the output port.

28. The solar collector of claim 27, comprising a fluid input connection comprising:
an opening for receiving in fluid-tight connection the proximal end of the first elongated member; and
a passage in fluid communication with the input port and the inflow ends of the plurality of mini channels located at the proximal end of the first elongated member, such that fluid input into the input port will flow through the passage into the inflow ends of the plurality of inflow mini channels.

29. The solar collector of claim 28, comprising a fluid output connection comprising:
an opening for receiving, in fluid-tight connection, the proximal end of the second elongated member; and
a passage in fluid communication with the output port and the respective outflow ends of the plurality of mini channels located at the proximal end of the second elongated member, such that fluid from the respective outflow ends will flow through the passage into the output port.

30. The solar collector of claim 29, wherein the first and second elongated members are substantially flat members, and where the respective openings in the fluid input connection and fluid output connection are formed as slits.

31. A solar collector comprising:
an evacuated enclosure which is at least partially transparent to solar light;
an input port for an inflow of a heat-transfer fluid;
an output port for an outflow of the heat transfer fluid; and an absorber within the enclosure comprising:
- an outer tube having a first elongated wall and an inner tube having a second elongated wall, the first and second elongated walls facing each other and extending from a proximal end to a distal end;
- a plurality of fins extending between the first wall and the second wall of the absorber, said fins defining a plurality of mini channels each extending between an inflow end located at the proximal end of the walls and outflow end located at the distal end of the walls; and
- an end cap comprising a mixing chamber and coupled to the distal end of the absorber,
- wherein the plurality of fins are formed as a corrugated sheet located between the first and second elongated walls; and
- wherein the inflow end of each mini-channel is in fluid communication with the input port and the outflow end outflow end of each mini-channel is in fluid communication with the output port.

32. The solar collector of claim 31, wherein:
- the first elongated wall is a tubular wall disposed about a longitudinal axis;
- the second elongated wall is a tubular wall disposed about the first elongated wall, and the second elongated member; and
- the plurality of fins extend substantially radially outward from the first elongated wall to the second elongated wall.

33. The solar collector of claim 32, wherein the first and second elongated walls are concentric cylinders.

34. The solar collector of claim 32, wherein the plurality of fins are substantially rigid members which provide mechanical support between the first and second elongated walls.

35. The solar collector of claim 32, wherein the plurality of fins are arranged in a corrugated pattern between the first and second elongated walls.

\* \* \* \* \*